United States Patent [19]
Levy et al.

[11] Patent Number: 6,145,121
[45] Date of Patent: Nov. 7, 2000

[54] TRACE BASED METHOD FOR THE ANALYSIS, BENCHMARKING AND TUNING OF OBJECT ORIENTED DATABASES AND APPLICATIONS

[75] Inventors: Henry M. Levy, Seattle; Ashutosh Tiwary, Kirkland; Vivek R. Narasayya, Bellevue, all of Wash.

[73] Assignee: University of Washington, Seattle, Wash.

[21] Appl. No.: 09/062,243

[22] Filed: Apr. 17, 1998

Related U.S. Application Data

[60] Provisional application No. 60/043,271, Apr. 17, 1997.

[51] Int. Cl.[7] ............................................ G06F 9/45
[52] U.S. Cl. ............................. 717/4; 703/22; 714/33; 707/103
[58] Field of Search ........................ 395/704, 705, 395/500.34, 500.41, 500.42, 500.43; 707/100, 103, 205, 206; 702/182, 186; 714/32, 33, 35, 37, 38, 45, 47; 703/13, 20, 21, 22; 717/4, 5

[56] References Cited

U.S. PATENT DOCUMENTS

| | | | |
|---|---|---|---|
| 5,437,027 | 7/1995 | Bannon et al. | 707/103 |
| 5,471,629 | 11/1995 | Risch | 707/201 |
| 5,701,471 | 12/1997 | Subramanyam | 707/200 |
| 5,794,256 | 8/1998 | Bennett et al. | 707/206 |
| 5,819,066 | 10/1998 | Bromberg et al. | 707/102 |
| 5,923,867 | 7/1999 | Hand | 395/704 |
| 5,930,497 | 7/1999 | Cherian et al. | 395/500.44 |
| 6,002,872 | 12/1999 | Alexander, III et al. | 395/704 |
| 6,006,224 | 12/1999 | McComb et al. | 707/5 |

OTHER PUBLICATIONS

Kohler et al., "A benchmark for the performance evaluation of centralized and distributed transaction processing systems", IEEE, 1990, pp. 488–493.

Cook et al., "A highly effective partition selection policy for object databse garbage collection" IEEE Trans. on Knowledge and Data Engg., Jan./Feb. 1998, pp. 153–172.

Schmidt et al., "Performance of a hardware–assisted real–time garbage collector", ASPLOS VI, ACM, 1994, pp. 76–85.

Williams et al., "Performance evaluation of software architecture", WOSP98, ACM, 1998, pp. 164–177.

Sloane, "Generating dynamic program analysis tools", !EEE, 1997, pp. 166–173.

Cook et al., "Partition selection policies in object database garbage collection", SIGMOD 94, ACM, 1994, pp. 371–382.

McAuliffe et al., "A trace–based simulation of pointer swizzling techniques", IEEE, 1995, pp. 52–61.

*Primary Examiner*—Kakali Chaki
*Attorney, Agent, or Firm*—Ronald M. Anderson

[57] ABSTRACT

A system and a method is disclosed for analyzing, benchmarking and tuning an object oriented database (OODB) and applications with a trace based technique. Code associated with the application is augmented with a plurality of instructions that define the production of an application execution trace and a database layout trace during execution of the application with a database. A precompiler or manual or automatic techniques are used to augment source code associated with the application. Alternatively, an instrumentor can be employed to augment object code associated with the application. A simulator employs the database layout trace and the application execution trace to simulate the execution of the application with an OODB selected by the user. The simulator may be ported to different OODBs or platforms. The simulator produces results associated with the simulation for input to a data analyzer. The data analyzer includes a user interface that enables a user to modify the simulation and can display the analysis of the simulation in real time. In another preferred embodiment, the present invention is employed with a distributed object oriented system that is implemented on multiple computers communicating by a network.

36 Claims, 23 Drawing Sheets

| OBJECT ADDRESS | TYPE | METHOD | ENTRY TIME STAMP | EXIT TIME STAMP |
|---|---|---|---|---|

*FIG. 9*

| OBJECT ADDRESS | TYPE | SIZE | OFFSET | ENTRY TIME STAMP | EXIT TIME STAMP |
|---|---|---|---|---|---|

*FIG. 10*

DATABASE GENERATION RESULTS

Database Size TEST: 173.6 MB
Total Number of Segments: 12
Average Segment Size: 14 MB
Average Number of ClusterGroups per Segment: 9
Total Number of Objects Created: 3766578
Number of Objects of Class PARTS: 2144753
Number of Objects of Class CYLINDER :1268973
Number of Objects of Class LINKS: 352852
Client Buffer Cache Size: 48 MB
Total Execution Time: 411 sec
Total User Time: 142 sec
Total System Time: 72 sec
Total I/O Time: 197 sec
Max Resident Set Size: 281 MB

*FIG. 13*

TRACE MANIPULATION TECHNIQUES WITH USER INTERFACE

1. BENCHMARKING: Combine 3 different traces and determine their performance on OODB1 and OODB2
   >> DBLayoutTrace = UNION(dbLayoutTrace1, dbLayoutTrace2, dbLayoutTrace3)
   >> ProgramExecutionTrace = MERGE(ProgramExecTrace1, ProgramExecTrace2, ProgramExecTrace3)
   >> MethodExecutionTimeSet = AVERAGE(MethodExecTime1, MethodExecTime2, MethodExecTime3)
   >> GENERATE DBLayoutTrace;   GENERATE ProgramExecutionTrace USING MethodExecutionTimeSet 2. ANALYSIS: Cold and Hot Pointer Translation Overhead for OODB1 for the application workload using multiple simulations.
   >> COLD: DROP object.access WHERE object.access > 1; GENERATE ProgramExecutionTrace; Simulate.
   >> HOT: ADD object.access UNTIL object.access = 5 USING DISTRIBUTION; GENERATE ProgramExecutionTrace; Simulate 3. TUNING: Generate different database clusterings and evaluate their performance
   >> // All objects of the same type in the same segment.
   >> SET object.segment = object.typename; GENERATE DatabaseLayoutTrace; Simulate
   >> // All objects accessed in 50 second period go in the same segment.
   >> SET object.segment = (object.timestamp DIV 50); GENERATE DatabaseLayoutTrace; Simulate 4. SCALING: Increase the number of T1 transactions by 10 times
   >> APPEND object.access FROM object.transaction = "T1" WHERE object.transaction = "T1" UNTIL object.access *= 10;
   >> GENERATE ProgramExecutionTrace; Simulate

*FIG. 11*

DATA ANALYSIS

1. Number of link objects added to the database in this execution by Transaction T1
   COUNT object WHERE transaction_type = T1 AND object.version = last+1 AND object.type = "link"?
   >> 5183
2. How much time did Transaction T3 spend in waiting for lock conflicts in OODB1 and OODB2?
   FOREACH $name in OODB SUM (object.unlock_time - object.lock_time) WHERE object.lock_confilict = TRUE
   >> OODB 1 = 41 sec
   >> OODB 2 = 105 sec

*FIG. 12*

APPLICATION EXECUTION RESULTS

Total Objects Created: 138765, Deleted: 568642, Updated: 11897652, Accessed: 23715564
PARTS Created: 77564, Deleted: 56498, Updated: 8817462, Accessed: 14144753
CYLINDER Created: 41982, Deleted: 0, Updated, 780162, Accessed: 11267911
LINKS Created: 0, Deleted: 0, Modified:0, Accessed: 3352715
Client Buffer Cache Size: 48 MB, Server Buffer Cache Size: 32 MB
Simulated Execution Time: 411 sec, User Time: 142 sec, System Time: 72 sec, I/O Time: 197 sec
Original Execution Time: 407 sec, User Time: 142 sec, System Time: 70 sec, I/O Time: 195 sec
Max Resident Set Size: 522 MB, Transient Allocations: 48368942, Transient DeAllocation: 1073421
Number of Page Faults: 37564, Voluntary Context Switches: 761, Involuntary Context Switches: 287
Total Number of Object Locks: 11897652, Lock Conflicts: 73498, Lock Upgrades: 65297, Avg Lock Time: 17 msec
Number of Database Calls: 661, Avg Call Time: 4 msec, Completed Transactions: 172, Aborted Transactions: 47
Average Time in Transaction T1: 12 sec, T2: 7 sec, T3: 2 sec
Number of Pointers swizzled: 81654369, Average Pointer Reuse: 12

*FIG. 14*

TRACE BASED METHOD FOR THE ANALYSIS, BENCHMARKING AND TUNING OF OBJECT ORIENTED DATABASES AND APPLICATIONS

RELATED APPLICATIONS

This application is a continuation-in-part of a previously filed U.S. Provisional Patent application, U.S. Ser. No. 60/043,271 filed on Apr. 17, 1997, the benefit of the filing date of which is hereby claimed under 35 U.S.C. § 119(e).

FIELD OF THE INVENTION

This invention generally relates to simulating the execution of a database application, and more specifically to simulating the execution of the application for different types of object oriented databases (OODBs) and producing data for analysis, benchmarking, and tuning of such OODBs and their applications.

BACKGROUND OF THE INVENTION

The construction of many large applications that manipulate complex data structures in domains like computer aided design (CAD), multi-media, network management, and telecommunications, has motivated significant research and development of OODBs. However, the development of tools and methods to analyze, compare, and tune the performance of these database systems has lagged behind. Furthermore, different users of OODBs have different needs for analyzing and comparing the performance of OODBs. For example, end users of OODBs are interested in comparing the overall performance of different OODBs for a wide range of workloads. Database application developers want to predict the performance of their particular application with different OODBs. Moreover, both end users and application developers are interested in benchmarking OODBs; the former with a very general workload and the latter with a specific workload.

A third category of users is interested in analyzing and tuning the performance of individual OODB components. For example, application architects want to identify the bottlenecks in an OODB by analyzing the overhead of different OODB system components for their application workload; OODB developers perform the same analysis, but for a general workload.

Current OODB benchmark workloads provide a general workload for benchmarking OODB systems such as a benchmark described by M. J. Carey, D. J. Dewitt, and J. F. Naughton in their paper "The OO7 Benchmark," Proceedings of the ACM SIGMOD conference, pp. 12–21, Washington D.C., 1993. However, these benchmark workloads cannot be used for the kinds of studies described above, because of the following three limitations. First, these are synthetic benchmarks, i.e., they are not based on any real application but on the designer's notion of a typical application. Due to limited correlation between the data structures and operations of a synthetic benchmark and real applications, it is difficult to relate the performance of an application to this type of benchmark. In addition, this problem also precludes use of these benchmarks in analyzing and tuning application performance. Most of these benchmarks model CAD workloads. Therefore, OODB users in other domains, such as multi-media, find it difficult to relate benchmark results to their applications. Finally, these benchmarks were not designed to allow systematic analyses of OODB components. For example, it has been shown that it is difficult to study the impact of different clustering strategies on benchmark performance for a particular OODB, without understanding and modifying the benchmark source code. Some of the problems associated with different clustering strategies are described by A. J. Tiwary, V. Narasayya, and H. M. Levy in a paper entitled "Evaluation of OO7 as a System and an Application Benchmark," Proceedings of the OOPSLA95 Workshop on Object Database Behavior, Benchmarks and Performance, Austin, Tex., October 1995.

The limitations of synthetic benchmarks may be overcome by using a collection of real applications. One collection is described by J. P. Singh, W. Weber, and A. Gupta in the paper "SPLASH: Stanford Parallel Applications for Shared-Memory," Computer Architecture News, vol. 20, no. 1, pp. 5–44. However, these collections of real applications are not feasible for OODBs, because most real OODB applications are proprietary. Furthermore, these applications are large and complex and porting them across multiple OODBs is difficult. The size and complexity of these applications also make it difficult to understand and modify their source code, which in turn makes their systematic analysis and tuning difficult and expensive.

Accesses to persistent objects can be recorded in three principal ways: (1) by instrumenting the OODB (the library and/or the server, depending on OODB structure); (2) by instrumenting the application executable; or (3) by instrumenting the application source code. Instrumenting the OODB is only useful to study a specific system, and only by a small set of people that have access to the system source code. Alternatively, as described by C. Lamb, G. Landis, J. Orenstein, and D. Weinreb in the paper titled "The Object-Store Database System," Communications of the ACM, 34 (10): 50–63, October 1991, the ObjectStore OODB ships with such instrumentation for performance counters in the client library and server; however, these counters are difficult to use and to correlate with application characteristics. The ObjectStore Performance Expert as described in the "ObjectStore Performance Expert Users Manual", provides an easy-to-use interface to the performance counters, but it does not relate database performance information to application characteristics. Such tools and instrumentation are limited to use on one database system and cannot be used to compare performance across multiple OODBs.

Object accesses may also be instrumented by modifying the application executable files using tools such as described by A. Srivastava, and A. Eustace in the paper "ATOM: A System for Building Customizable Program Analysis Tools," Technical Report WRL-TR-94.2, DEC Western Research Laboratory, Palo Alto, Calif. 1994. Although this approach does not require application source code, it is more difficult and less efficient to detect persistent objects, distinguish between application and library functions, and detect inlined methods. Finally, OODBs that swizzle at an object granularity use a level of indirection in accessing persistent objects to perform residency checks and object loading. This indirection provides a convenient instrumentation point and does not require access to the OODB source code. However, instrumenting the indirection point via language mechanisms (which overloads the dereference operator), does not capture key information such as the name of the method invoked. Thus, it appears preferable to instrument the application source code, because this approach is most suitable for generating traces efficiently across a variety of different OODBs, operating systems, and hardware platforms.

Trace-based analysis and simulation have been used in the study of file systems, virtual memory systems, and memory management. M. G. Baker, J. H. Hartman, M. D. Kupfer, K. W. Shirriff, and J. K. Ousterhout describe employing trace based analysis of file systems in "Measurements of a Distributed file system," Operating System Review, vol. 25, no. 5, pp. 198–212, 1991. D. J. Hartfield and J. Gerald discuss using trace based analysis for studying virtual memory systems in "Program Restructuring for Virtual Memory," IBM Systems Journal, vol. 10, no. 3, pp. 168–192, 1971. Also, P. R. Wilson, M. S. Lam, and T. G. Moher described employing trace based analysis for memory management in the paper "Caching considerations for generation garbage collection," Proceedings of the 1992 ACM Conference on LISP and Functional Programming, pp. 32–42, San Francisco, Calif., June 1992.

Trace-based analysis and simulation have also been used to study specific OODB properties like buffering and clustering, and pointer swizzling. E. E. Chang and R. H. Katz discuss the study of specific OODB buffering and clustering properties in their paper "Exploiting Inheritance and Structure Semantics for Effective Clustering and Buffering in an Object-Oriented DBMS," ACM SIGMOD International Conference on Management of Data, Portland, Oreg., pp. 348–357, 1989. J. Cook, A. Wolf, and B. G. Zorn describe trace driven simulations in their paper "The Design of A Simulation System for Persistent Object Storage Management," Technical Report CU-CS-64, Department of Computer Science, University of Colorado, Boulder, Colo. Cook et al. have designed a trace driven simulation system for the evaluation of different algorithms to be used in OODBs, but it has not been reduced to practice. Further, it is unclear how they intended to gather these traces and its impact on real applications. Also, M. McAuliff and M. Solomon discuss pointer swizzling in the paper "A Trace-Based Simulation of Pointer Swizzling Techniques," Proceedings of the International Conference on Data Engineering, Taipei, Taiwan, March 1995. McAuliff and Solomon discuss a trace based simulation technique for pointer swizzling, which requires manual instrumentation of a specific server to capture accesses to persistent objects. A specialized simulator was used to study different swizzling techniques. None of these tracing and swizzling techniques were generalized to study OODB performance in general. All of these previous approaches provide for manually instrumenting the database server to create traces. However, the prior art does not teach a comprehensive framework for analyzing, benchmarking, and tuning OODB systems and applications, based on automafically generated traces. Clearly, there is a need for an automated system to facilitate these functions, which does not exist in the prior art.

SUMMARY OF THE INVENTION

In accord with the present invention, a method is defined for simulating the execution of an application with an object oriented database (OODB). The method includes the step of augmenting code comprising the application. The augmented code includes new instructions that define the execution of the application for producing an application trace and a database trace. The augmented code are then executed to produce an application execution trace and a database layout trace. Finally, a simulator is employed to simulate the execution of the application with the database. The simulator uses the database layout trace and the application execution trace to produce a simulation that yields results for analysis, e.g., analysis of the execution of the application with the database.

Additionally, the object addresses in the application execution trace and the database layout trace may be mapped from database addresses to logical addresses. The application execution trace has a data structure that comprises an object address, a type, a method, an entry time stamp, and an exit time stamp. Further, the database layout trace has a data structure that includes an object address, a type, a size, an offset, an entry time stamp, and an exit time stamp. Also, the method may include the step of producing a simulation database from the database layout trace. Moreover, a storage medium that includes processor-executable instructions that may be executed on a computer to implement the steps of this method is another aspect of the invention.

In a first preferred embodiment, the step of augmenting comprises at least two steps. First, source code comprising the application are precompiled prior to augmentation, producing augmented source code. Alternatively, a user may manually augment the source code or an automatic augmentation method may be used. In the second step, the augmented source code is compiled to produce augmented object code that is linked to a trace recording library. The augmented object code is executable by a computer. Additionally, this embodiment may analyze the source code and determine parameters associated with the source code, which are employed in the precompiling to produce the augmented source code. The parameters may include a persistent class set, persistent-transient set, or class structure description. Also, different parameters may be used in the production of augmented source code, including a mapping of database calls to instrument and a set of methods to instrument the source code. Additionally, different parameters may be used in the production of the augmented object code, including a procedure describing database roots, a trace recording library, and a trace timing library.

In another preferred embodiment, augmenting the code comprises the step of instrumenting object code comprising the application to produce the augmented object code that is executed by the computer.

The method may comprise the step of providing modifications to the database layout trace and the application execution trace by enabling the user to modify at least one parameter associated with the simulation. The modifications to the database layout trace and the application execution trace modify the results produced by the simulation. The modified results enable the user to evaluate the execution of the application with the modifications. The method includes the step of enabling the simulation to be rerun after the modifications have been made. The results from the simulation with these modifications may be used for analysis and comparison by the user.

In yet another embodiment of the method, the user is enabled to select another OODB for simulation and then run the simulation on the other OODB. The results from running the simulation on the two different OODBs can then be compared. Running the simulation on the other OODB further comprises the step of generating a layout for each object in the database created on the other OODB from the database layout trace. The database layout trace is used for determining the structure and disposition of each object in the other database. Also, the simulation on the other OODB simulates the application execution trace with the layout for the other OODB.

In still another embodiment, the method includes the step of manipulating the application execution trace in accord with an input provided by the user. Next, the step of generating a modified application execution trace that includes the input is performed, so that the modified application execution trace is employed to produce the simulation. Analogously, yet another embodiment of the method includes the step of manipulating the database layout trace in accord with an input provided by the user. Also, the step of generating a modified database layout trace that includes the input modifications specified is performed, so that the modified database layout trace is employed to produce the simulation. Additionally, the input provided by the user may indicate that a different database clustering is to be used for the simulation.

In one embodiment, the method comprises the step of employing the database layout trace to produce parameters that include database names, database roots, a logical address to database address mapping, and results associated with the database layout trace. Further, the method may comprise the step of employing the application execution trace to produce results. Also, the method may include the step of accessing and updating the simulation database. Additionally, calls mapped to the OODB may be mapped to another OODB selected by the user.

In a further embodiment, the method includes the step of producing an analysis of the simulation that enables the user to analyze results associated with the application execution trace and results associated with the database layout trace. The results associated with the application execution trace and with the database layout trace may be compared to a previous result.

In still another embodiment, the method includes the step of displaying the analysis to the user. The analysis may be displayed in real time.

In a further embodiment, the present invention is employed with a distributed object oriented system (DOOS) that is implemented on multiple computers communicating by a network. The application execution trace is employed by the application simulator to simulate the execution of the application on the DOOS. The user may modify the application execution trace so that the results produced by the simulation are modified. The modified results enable the user to evaluate the execution of the application with the modifications. The method includes the step of enabling the simulation to be rerun after the modifications have been made. The results from the simulation with these modifications may be used for analysis and comparison by the user.

In another embodiment, the user is enabled to select another DOOS for simulation and running the simulation on the other DOOS. Other results from running the simulation on the other DOOS is compared to the results from running the simulation on the DOOS.

A further aspect of the present invention is directed to a system that simulates the execution of an application with an object oriented database. The system includes a processor that is coupled to a memory that includes instructions for implementing the present invention. The elements of this system are generally consistent in function with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 15:
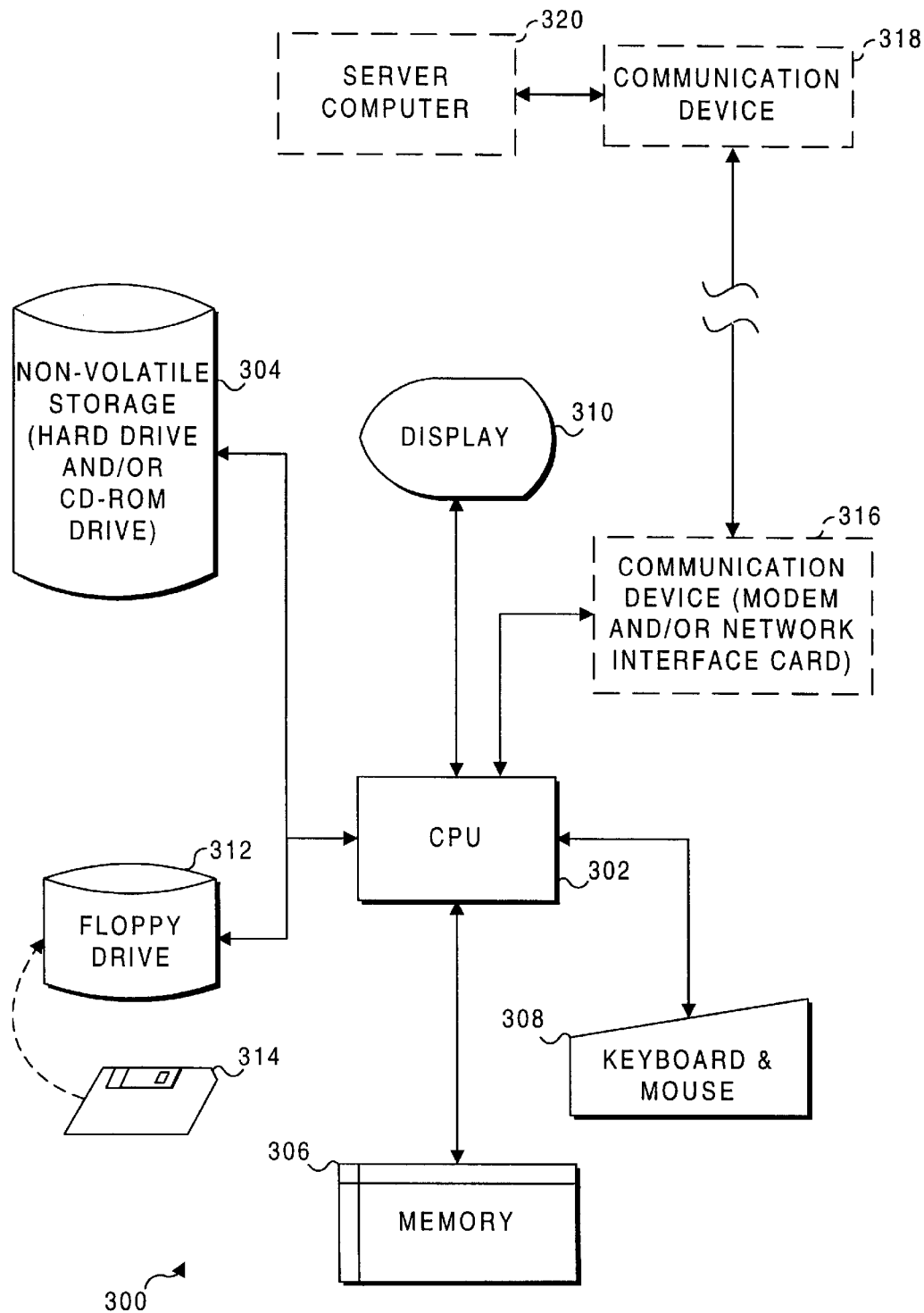
Figure 16A:
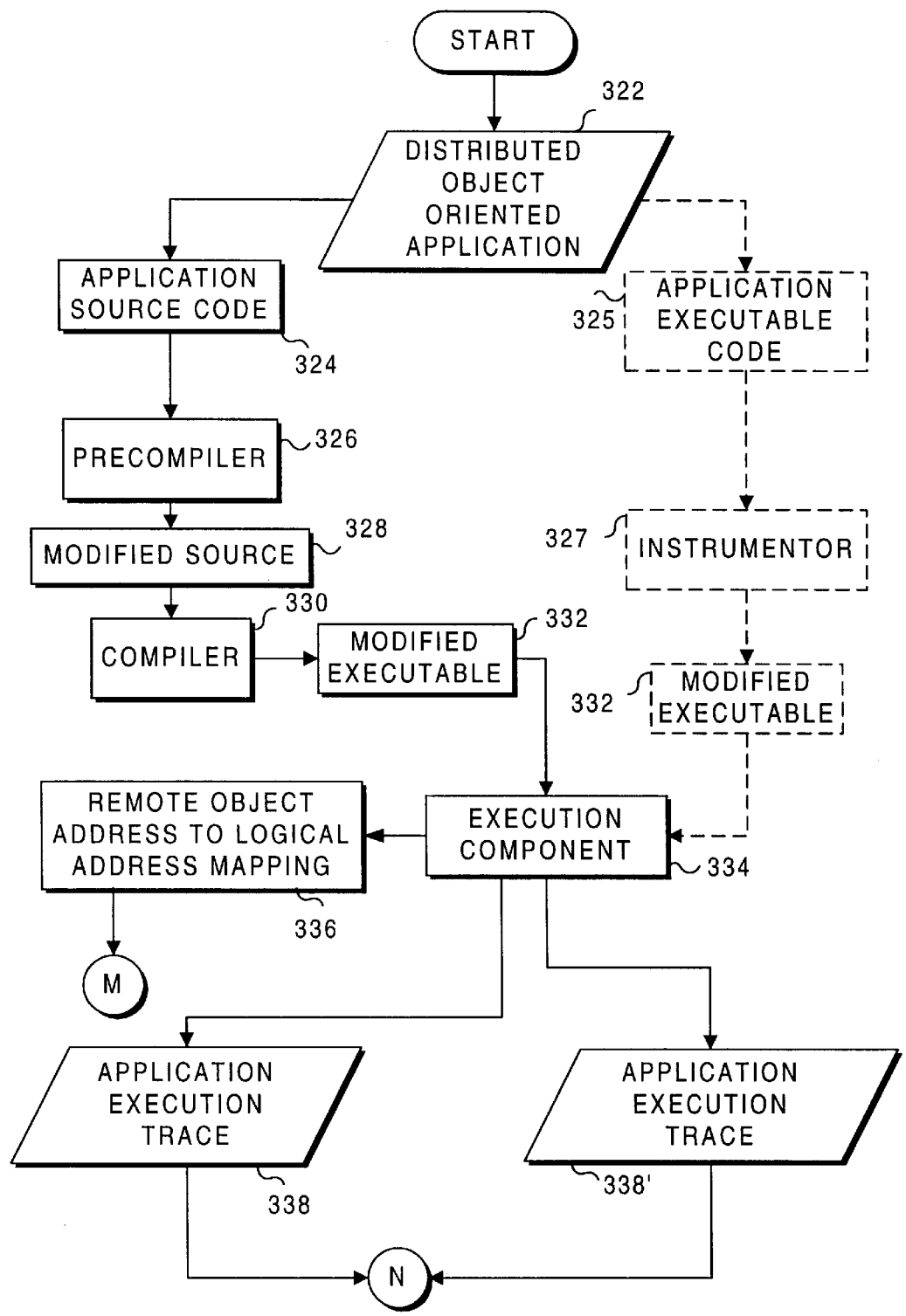
Figure 16B:
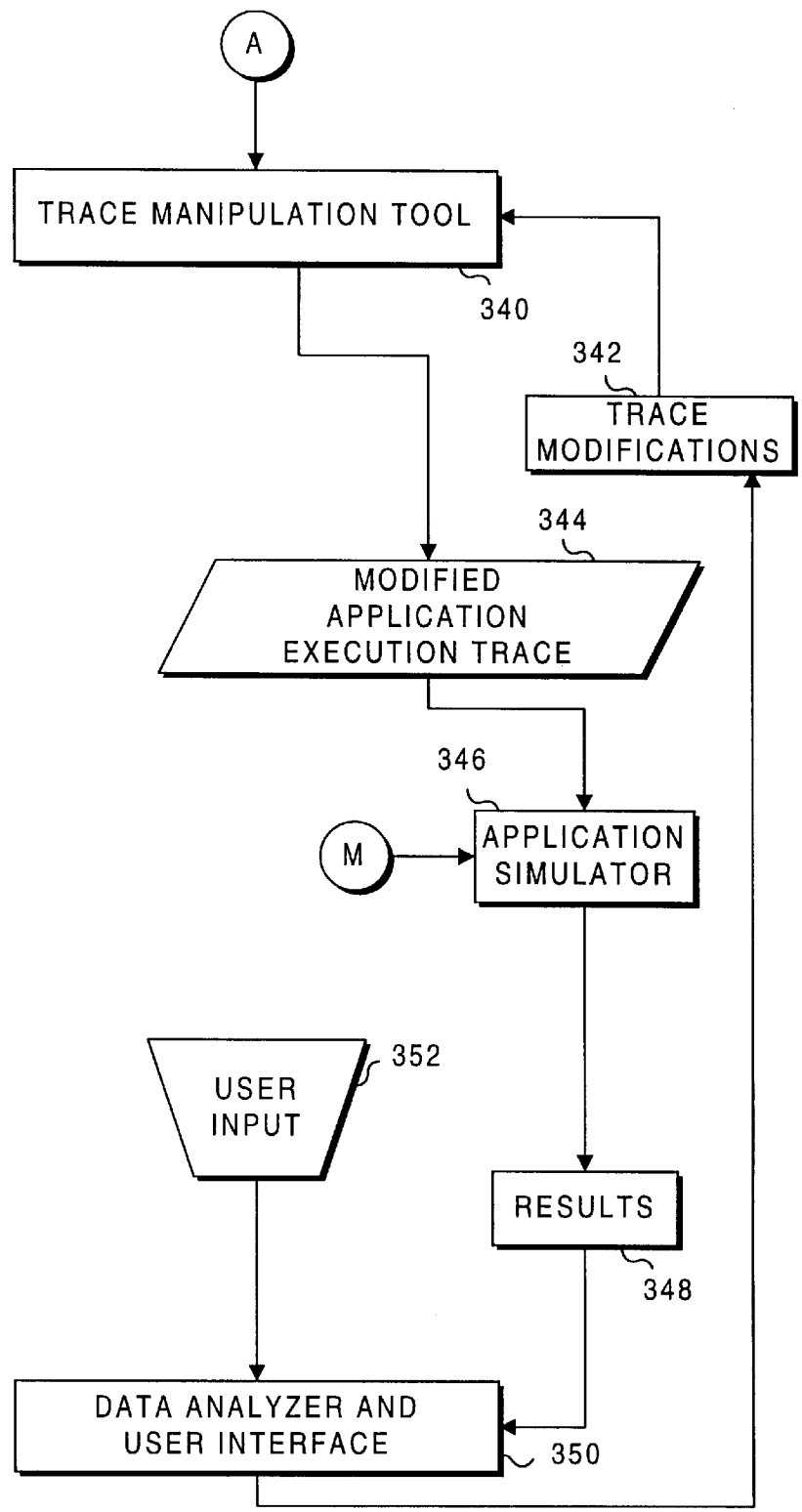

FIGS. 8a, 8b, 8c, 8d, and 8e are a detailed schematic diagram of the logic flow between data and the functional components in the present invention for an OODB;

FIG. 9 is a data structure for an application execution trace entry;

FIG. 10 is a data structure for a database layout trace entry;

FIG. 11 is a table listing techniques for manipulating a trace with a graphic user interface;

FIG. 12 is an exemplary table of a data analysis produced by the data analyzer of the present invention;

FIG. 13 is an exemplary table of the results produced by generating a database, in accord with the present invention;

FIG. 14 is an exemplary table of the results produced by executing an application instrumented with the present invention;

FIG. 15 is a schematic block diagram of a typical computer system suitable for implementing the present invention;

FIGS. 16a and 16b are a schematic diagram illustrating the logical flow of the functional elements and steps employed by the present invention for a distributed object oriented system (DOOS); and FIGS. 17a, 17b, 17c, and 17d are a detailed schematic diagram of the logic flow between data and the functional components in the present invention for a DOOS.

DESCRIPTION OF THE PREFERRED EMBODIMENT

Figure 1:
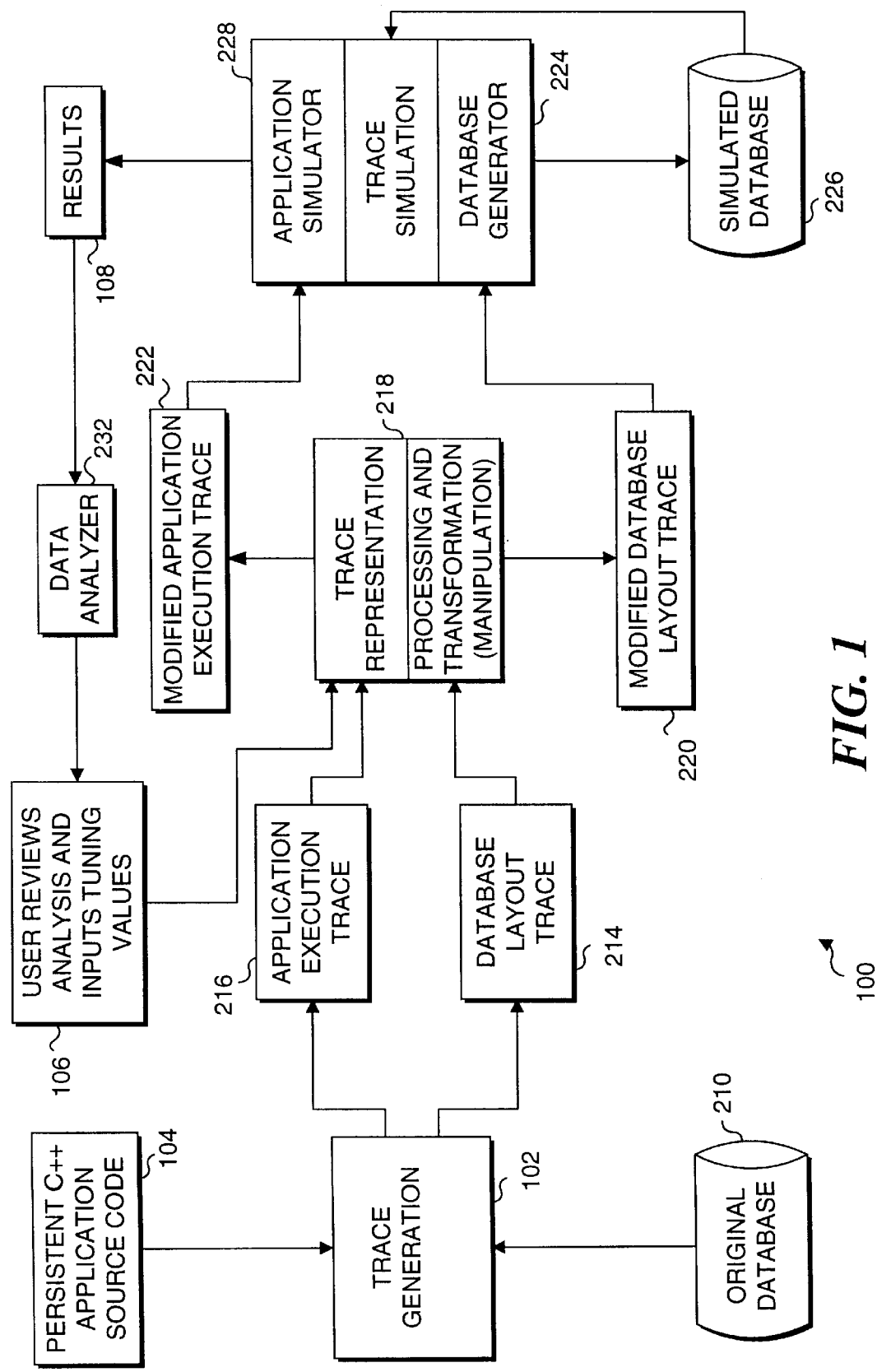
FIG. 1 is a general block diagram showing the functional components of the present invention.

The present invention is a methodology for analyzing, benchmarking and tuning object-oriented database (OODB) systems and their applications based on capturing and simulating persistent object access traces. FIG. 1 provides an overview 100 of the main components of the present invention, i.e., a trace based analysis, benchmarking and tuning system. In the preferred embodiment, a set of tools are employed to instrument persistent C++ database applications, capture their database structure, and record persistent object access traces. Using such traces, a simulator recreates the original database structure and replays the access pattern on other OODB systems. The present invention enables a user to compare the behavior of the application across multiple OODBs, without porting the application itself. Also, this invention enables the modification of the traces in controlled ways, so that the user may study different aspects of the application and OODB performance. Initial measurements indicate that the overhead of the tools implemented in the present invention is small and scales well with database size. A collection of traces that are obtained from real database applications may be employed to provide the foundation for an OODB benchmark. The versatility of the present invention in studying the performance of database and related applications to enable optimal tuning is a further important aspect. For example, application and database tuning can be accomplished by combining performance metrics in an iterative feedback loop that enables the user to control a plurality of modifications that are simulated with the traces produced by the procedure.

A brief discussion of the overview shown in FIG. 1 will provide a basis for the more detailed explanation of the invention that follows below. In FIG. 1, a persistent C++ application source code 104 and an original database 210 are employed by a trace generator 102 to produce an application execution trace 216 and a database layout trace 214. The present invention overcomes the problems of the prior art by abstracting the persistent behavior of applications. Tools are employed to instrument persistent classes in C++ applications and their calls into the OODB. When executed, the instrumented application generates two traces: a trace of persistent object accesses (an application execution trace 216), and a trace that describes the structure and layout of the underlying database (a database layout trace 214). These traces capture the persistent behavior of the original application in an OODB-independent fashion. A tool 218 provides a trace representation for application execution trace 216 and produces a modified application execution trace 222 for an application simulator 228. Also, tool 218 enables processing and transformation (manipulation) of database layout trace 214 and produces a modified database layout trace 220 for a database generator 224, which creates a simulation database 226.

The present invention uses database generator 224 to create simulation database 226 (that is similar to the original database) on different OODBs and uses application simulator 228 to replay (simulate) the application execution trace against the simulation database, thereby providing an approximation of the original application on the new OODBs. It has been found that such traces provide an accurate approximation of the original application behavior (represented by results 108), which is input for analysis by a data analyzer 232. The present invention is adapted for enabling the user to modify the traces in controlled ways to facilitate analysis and tuning of the application and OODB, without modifying the application source code, and to provide tuning values to tool 218, as indicated in a block 106. A collection of the traces obtained from real applications provides a good foundation for creating an OODB benchmark.

One important aspect of the present invention is that public availability of application source code is not required for benchmarking, since only the traces need to be made public. The scope of a benchmark based on a family of traces is no longer restricted to one domain, such as computer aided design (CAD), but can represent a variety of domains, depending on the applications available for tracing. The problem of porting large applications to new OODBs is now reduced to the simpler problem of porting an appropriate simulator to each of the new OODBs. Since the traces represent the original application, they may also be used to predict the performance of the application on a different OODB. It is not necessary to map application characteristics to synthetic workloads like OO7, because a set of these traces becomes an application-specific benchmark. The ability to modify traces in a controlled manner enables the user to analyze and tune different aspects of the application and OODB behavior, without iterative modification of the application source code. The present invention's trace-based analysis, benchmark and tuning mechanism covers the spectrum of workloads and study capabilities.

The methodology used in the present invention hinges on the hypothesis that a trace captures the persistent object access behavior of the original application. To ensure the correctness of this approach, the traces capture the order and relative timing of persistent object accesses, as well as the number, size, and layout of objects in the database. To ensure performance similar to the original application (since the trace is executed on a real OODB), the simulator must accurately execute these traces with minimal overhead. The present invention has been tested on the OO7 benchmark. Both the original application and the present invention's simulation were employed with three different OODBs. The OO7 measurements indicate that the hypotheses upon which the tools employed in the present invention was based is correct.

The trace-based analysis, benchmarking, and tuning system of the present invention consists of a family of tools: (1) the front-end trace generation tools, (2) the intermediate trace representation and processing tools, and (3) the back-end trace simulation tools. The relationship between these different components of the system is shown in FIG. 1. In the following discussion, the principal ideas of the invention are discussed in regard to the implementation of the system and in relation to the results of several experiments that confirm the functionality and utility of the invention.

Theory of Operation

Trace generation tools 102 (FIG. 1) automatically instrument the relevant methods (explained below) of persistent objects in the C++ application source code. Execution of this instrumented code generates application execution trace 216. Also, the trace generation tools add additional methods to the persistent objects; these methods are invoked to generate the database layout trace. The application execution trace and the database layout trace are then combined and converted into an intermediate trace representation. Trace processing and transformation tools 218 manipulate this intermediate trace representation and enable the user to vary the application and database characteristics in controlled ways (using analysis or tuning inputs as indicated in block 106) to analyze the performance of the application and the OODB. The modified trace representation is processed to generate modified application execution trace 222 and modified database layout trace 220. The modified database layout trace is processed first by database generator 224 to recreate the original database layout on the target OODB. The application simulator then replays the modified application execution trace against this database. Simulation results 108 are fed back to the user, who is enabled to iteratively modify the trace and re-simulate it to try and achieve a desired level of performance. After completing the tuning cycle, the trace modifications entered in the simulation must be manually translated to actual modifications of the application source code, since that code is not directly affected by the present invention.

Trace Generation

Figure 2:
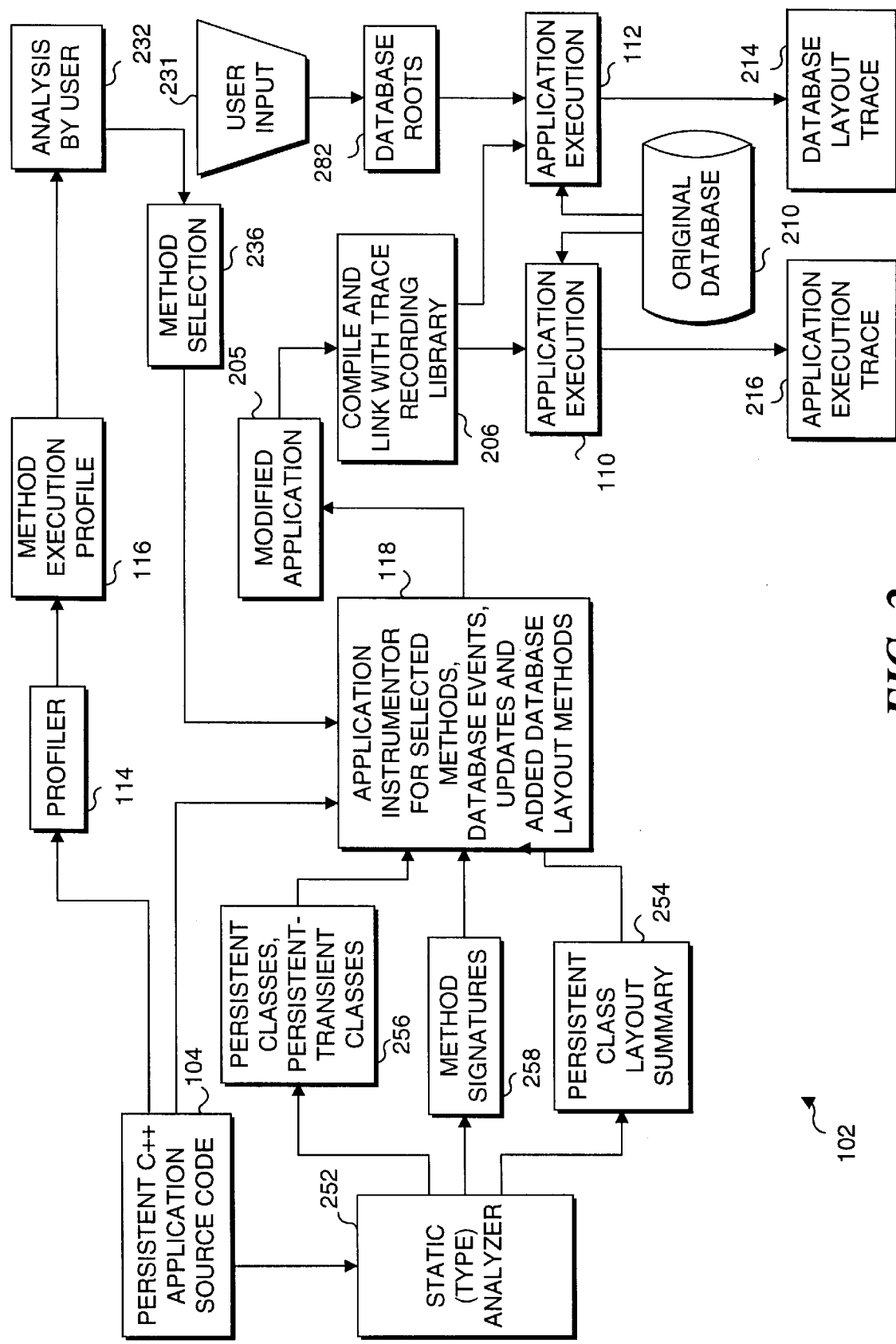
FIG. 2 is a block diagram illustrating the functional components for producing an application execution trace and a database layout trace.

The following explanation is in reference to FIG. 2, in which details of trace generation 102 are shown at the left of the block diagram. Accesses to persistent objects are collected by directly instrumenting persistent C++ application source code 104. A static analyzer 252 instruments each relevant method implemented in the code to record an object address, an object type, an invoked method, and a time stamp at method entry and exit. Method entry and exit times are needed to construct a full object access graph that retains the original order of access to persistent objects. It is easy to detect and instrument method entry, but it is more difficult to detect method exit, particularly in the presence of exceptions. A preferred embodiment of the present invention employs an instrumentation technique that relies on C++ semantics, which guarantees that the destructor of an object allocated on the stack is invoked before the stack is unwound. In addition, the invention instruments the method entry to allocate a small object on the stack and uses its constructor and destructor for recording method access. The analyzer is sufficiently robust to deal with templates and overloaded methods. In addition to method accesses, the present invention also instruments the creation/deletion of persistent objects, updates to attributes of persistent objects, and database events such as open, close, begin/end transactions.

The data structure for an application execution trace entry is illustrated in FIG. 9. This data structure is overloaded for other records, such as create/delete/update and database events. To recreate the original database, the structure and layout of the entire database are captured as a trace of a full database traversal (database layout trace) by using the tools described above. The location, size and type of each object, as well as the type, offset and value of each of the pointers in the object are captured. The pointer information is important to retain relationships between objects. The location information is captured both as an object address and a clustering hint (database name, segment name, etc.) for the object. Since no database values are captured, the trace does not contain any proprietary information. The present invention uses the type information generated by static analyzer 252 to automatically generate and add a database-layout method (which recursively invokes the database layout method of all objects it points to), to persistent classes. Given a set of root objects in the database (provided by the user), the invocation of this method at the root generates the database layout trace. The data structure of a database layout trace entry is illustrated in FIG. 10.

Returning to FIG. 2, static analyzer 252 processes the persistent C++ application source code and identifies a set of persistent classes and transient classes 256, a persistent class layout summary 254 (class structure descriptions), and method signatures 258. These data are input to a tool 118 for instrumenting selected methods, database events, updates, and adding database layout methods. A modified application 205 is produced, and a compiler 206 compiles the modified application and links it with a trace recording library. In a block 110, the compiled application is executed, and application execution trace 216 is produced. Also, in a block 112, the compiled application is combined with a user input 231 of one or more database roots 282 to produce database layout trace 214. Also, persistent C++ application source code 104 is provided to a profiler 114 that produces a method execution profile 116. In a data analyzer 232, the user analyzes method execution profile 116 to provide a method selection input 236 to tool 118.

In order for application execution trace 216 to correctly represent the persistent object access behavior of the original application, it must: (a) capture all the accesses to persistent objects, (b) preserve the original order of accesses to persistent objects, (c) capture important database events, and (d) preserve the relative timing between the object accesses. Accomplishing (d) captures the non-persistent behavior of the application, such as user interaction, other I/O, computation, and accesses to transient objects. The optimizations that accomplish these objectives and avoid significantly altering the behavior of the application are discussed below.

Database layout trace 214 represents the original database correctly if the original database and the layout trace both have: (a) the same number of objects, (b) the same object sizes, (c) the same pointer relationship between the objects, and (d) the same relative positions of the objects (to minimize the impact on clustering, etc.). The present invention ensures that requirements (a), (b), and (c) are met. However, success in achieving requirement (d) is constrained by the degree of support the underlying OODB offers for object placement and determining the locations of objects stored on disk or other non-volatile memory.

Trace Processing and Transformation

To enable the user to analyze and tune the performance of the application on the OODB, the present invention combines the database layout trace and the application execution trace into an intermediate representation that facilitates interesting modifications of both the database layout and the persistent object access pattern. This intermediate trace representation is a directed graph where each node represents an application object and a link between two objects specifies the temporal order of access. The graph completely captures all of the information in the original traces.

There are two main advantages in converting the database layout trace and the application execution trace to the intermediate representation. The first advantage is that it simplifies the analysis of the trace. Examples of such analyses include determining: the total number of pointers dereferenced by the application, the average number of times a pointer was dereferenced, the size and distribution of objects, and object connectivity information. The second advantage is the intermediate representation enables the user to transform the representation in interesting ways, as described below.

The graph representation of the trace can be systematically transformed into a variant graph based on specific analysis input values determined by the user. The variant graph is then traversed to produce a modified trace. For example, the user is enabled to change the number of times a pointer is dereferenced for a particular class of objects in the database. This parameter determines the number of times a pointer is reused so that the cost of translating that pointer may be amortized over these dereferences and is used to study pointer translation overheads of different OODBs in order to select one suitable for an application swizzling workload. Additionally, the user is enabled to generate a database with objects re-clustered, based on the type of the object or the order in which objects are accessed in the trace. This option is used to analyze and tune application clustering. Finally, the present invention traverses the graph to generate the modified database layout trace and modified application execution trace.

Trace Simulation

The present invention first executes the processed database layout trace to create a database of objects that forms the substrate for simulating the application execution trace. This database of objects (simulation database) resembles the original database in terms of: (a) the number and sizes of objects, (b) the pointer relationship between objects, and (c) the relative positions of objects in the database (clustering). Both (a) and (b) are obtained from the database layout trace and additional type information provided by the trace generation tools. To the extent that the original OODB gives clustering and object location information, and the target OODB gives some control over object placement, the present invention reproduces the original layout of objects.

The application execution trace indicates which object in the simulation database to access next and which method to invoke on that object, i.e., how much time to spend in that method. The trace also indicates the attributes to update in a method, the time to wait between successive method invocations (to account for transient computation), and when to call the database (corresponding to the database events in the original application). A faithful execution of this trace on an accurate simulation database ensures that all persistent objects accessed in the original application are accessed in the proper order.

In FIG. 1, application simulator 228 has a component that is responsible for replaying the trace and a component for interfacing with the database to fetch the desired objects. The simulator has timing mechanisms built into it that allow the user to accurately measure different components of the total simulation time. Since the functionality of the application simulator is preferably split into two separate modules or components, the application simulator may simulate client-server behavior by running the components on different nodes.

Implementation of Trace Generation

The present invention must ensure that the overhead of the instrumentation technique does not significantly alter application behavior, particularly for interactive applications. Achieving this result requires minimizing the impact on running time and the memory footprint of the augmented application. The runtime overhead includes the method-recording overhead (for each instrumented method invocation, the time for invoking the constructor and destructor of a small C++ object, and for writing a log record to a buffer), the time for computing the timestamps, the time for making runtime checks of persistence, and the time spent in writing the log to disk. The memory footprint is primarily impacted by the size of the log buffer. Some of the implementation techniques used to minimize these overheads are described below.

The trace generation overhead can dominate application performance if the method-recording overhead is high and if the present invention instruments frequently invoked methods that do very little work. As shown in method selection block 236 in FIG. 2, the application is automatically profiled, and the user enabled to choose methods from among the methods instrumented for tracing. Selecting the correct method(s) to instrument, the low overhead of allocating objects on the stack, along with inlined invocation of the constructor and destructor significantly reduces the impact of tracing on the application.

The present invention uses time stamps to: (a) order all persistent object accesses in the application to preserve the original access pattern, and (b) to compute the relative time between object accesses. Time stamped traces may also be used to collectively study distributed applications with persistent object accesses. Whenever possible, the present invention uses fine-grained timers to directly capture the method timing information; otherwise, it interpolates between periodic time-stamps in order to reduce the overhead of fine-grained timing.

Since the present invention records accesses to persistent objects, it needs an efficient method to determine the objects that are persistent. To minimize the number of run time persistence checks, the analyzer statically partitions all classes in the application into three orthogonal sets: (a) a persistent set, which contains all classes whose instances are always persistent objects; (b) a transient set, which contains all classes whose instances are always transient objects; and (c) a persistent-transient set, which contains all classes whose instances may either be persistent or transient. Runtime persistence checks only need to be performed for instances of classes in set (c) and only the classes in (a) and (c) need to be instrumented.

OODBs use one of a limited number of techniques to create persistent objects, such as overloading a new operator. In FIG. 2, application instrumentor 118 instruments all persistent object allocations of classes in the persistent-transient set to store the persistent object identifier in a hash table. All the instrumented methods of classes in the persistent-transient set consult this hash table at run time to determine if the object being accessed is persistent. The number of persistent objects allocated from the persistent-transient set of classes is typically quite small, and the size of the hash table has minimal impact on the memory footprint of an application.

Trace Processing and Transformation

The inputs to the trace processing phase are application execution trace 216 and database layout trace 214. These two traces are combined into a graph representation (data structure) in which each node in the graph represents an object in the database and consists of the following information: (a) a unique identifier for the object, (b) a location of the object in the database (object address and its logical location in the database), (c) a size of the object, (d) a type identifier for the object, and (e) location of and type of pointers in the object. A link in the graph is equivalent to a log record of the application execution trace. If there are n nodes and m trace entries, the size of the graph is O(m+n). The trace is essentially a post-order traversal of the graph of objects in the original application. This graph representation may be manipulated by techniques illustrated by the instructions listed in the table of FIG. 11.

Trace Simulation

Each object in simulation database 226 (FIG. 1) must be an instance of some class. Database generator 224 automatically generates a stub class declaration for each unique type in the original database. Modified database layout trace 220 is processed in two phases. The first phase creates the objects in the database for all unique object identifiers in the trace, and the second phase fills in the pointers between objects. Thus, the resulting simulation database has the same structure as the original database. Database generator 224 also produces the database roots and a table mapping the logical addresses from the original database to the database addresses in the simulation database.

To simulate the application execution trace on the simulation database, the present invention needs to know the database address of each object accessed. The logical address to database address mapping is used to transform the application execution trace so that it can be replayed by application simulator 228. The simulator uses the database address from each trace entry to obtain a reference to the object, which is dereferenced to simulate the invocation of the specified method.

Compared to the original application, application simulator 228 has the additional overhead of fetching modified application execution trace 222 from storage on a hard drive or disk. To minimize the impact on the running time and the I/O of the original application, the present invention prefetches the trace using a separate process. The prefetching mechanism guarantees that when application simulator 228 touches a particular trace entry, the corresponding page is already loaded into memory. This simple trace replay mechanism coupled with the low overhead of application simulator 228 ensures that the simulated trace accurately represents the persistent object access behavior of the original application.

Scope

The present invention assumes a runtime mechanism to correctly determine object persistence at the time an object is accessed. This mechanism is expensive in systems with implicit persistence such as reachability-based persistence, as discussed by M. P. Atkinson, K. J. Chisholm, and W. P. Cockshott in "PS-Algol: an Algol with a Persitent Heap," ACM SIGPLAN Notices, vol. 17, no. 7, July 1981. Except for updates to objects, the present invention may not gather fine-grained access information about which part of the object was accessed. This information is usually only relevant for very large objects. The lack of fine grained object access information is offset by the simulator options that allow the object to be touched in different ways (e.g., entire object, first byte only, first and last byte). The present invention also does not capture any database accesses to internal objects (like indices and collections) that result from executions within the database engine. For example, the preferred embodiment does not record accesses to persistent index objects by a database query. However, the present invention may record accesses to all persistent application objects by queries. It is important to note that most OODB applications make limited use of system supplied query and indexing facilities.

The performance and proper functionality of the present invention is somewhat dependent on the degree of support the underlying OODB provides for object placement and in finding an object on disk. The performance of the preferred embodiment may be unpredictable in the absence of such information. Finally, there is a fundamental tension between accuracy of the application execution trace and the performance impact on the application. The present invention addresses this problem by optimizing the tools to reduce the overhead of capturing traces and by allowing the user to control this trade-off.

Experiments and Results

In the above discussion, it was noted that the construction of tools employed in the preferred embodiment of the present invention ensures that the traces accurately capture the behavior of the original application. In this section, the results of experiments and measurements that confirm this assertion are provided. For example, it has been found that: (a) the cost of collecting, processing and simulating traces with the present invention does not encroach upon the effectiveness of the methodology used, (b) the behavior of the simulated trace indeed follows the behavior of the application on the same system, (c) the traces produced by the invention may be used to predict the performance of the application on different OODBs and, (d) the application simulator preferably used is easily portable to multiple OODBs. The OO7 application was employed as the sample application for these experiments, because of its public availability and popularity with the OODB community. The T1 traversal was used, because it represents the worst case scenario for the tools employed in the present invention, so that even moderate scalability in these experiments would indicate good scalability with real applications. The measurements shown below were made on a Digital Equipment Corporation (DEC) computer having a 133 MHz Alpha™ central processing unit (CPU), 64 MB of random access memory (RAM), and a Seagate Corp. ST15230N hard disk, and on a Silicon Graphics Incorporated (SGI) Indigo™ computer having a 100 MHz R4000 CPU, and 96 MB of RAM.

Figure 3:
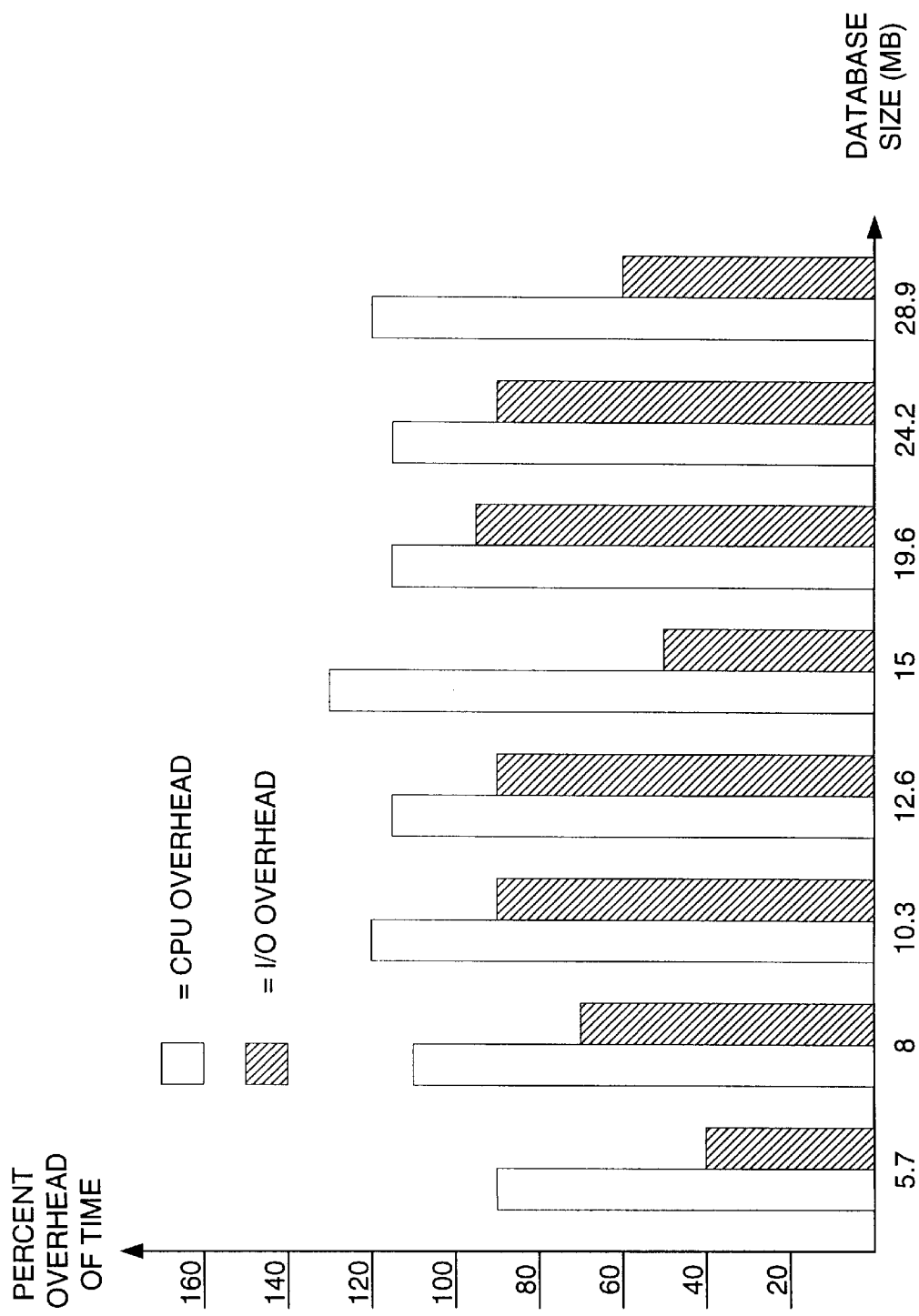
FIG. 3 is a histogram of a time percentage for input/output (I/O) and central processor unit (CPU) overhead as a function of database size.

In FIG. 3, the trace generation overhead for OO7/T1 running on Opal is illustrated. Opal is a computer operating system that is particularly well suited for the implementation of OODBs and is described by J. S. Chase, H. M. Levy, M. J. Feeley, and E. D. Lazowska in "Sharing and Protection in a Single Address Space Operating System," ACM Transaction on Computer Systems, November 1994. The CPU and input/output (I/O) overhead of the trace generation tools employed in this preferred embodiment and their scalability with database size is evident in this histograph. The indicated overhead is the percentage increase in the CPU and I/O time resulting from running the T1 traversal of OO7 with the instrumentation code compared to running without the instrumentation code. It is important to note that this histogram indicates what is nearly the worst case overhead for the trace generation tools of the present invention; OO7/T1 has a large number of invocations of very small methods (which were all instrumented) that just access the persistent object and do little work. This overhead and scalability obtained for this extreme workload is acceptable and indicates that the overhead of these techniques will be much smaller on most real and interactive applications, which spend some time on computation and user interaction.

A prior art technique has been used to trace a real interactive CAD application, and the measured overhead was considered acceptable by the users. A. Tiwary, V. Narasayya, and H. M. Levy discuss this technique in the paper "Evaluation of OO7 as a System and an Application Benchmark," Proceedings of the OOPSLA95 Workshop on Object Database Behavior, Benchmarks and Performance, Austin, Tex., October 1995.

Figure 4:
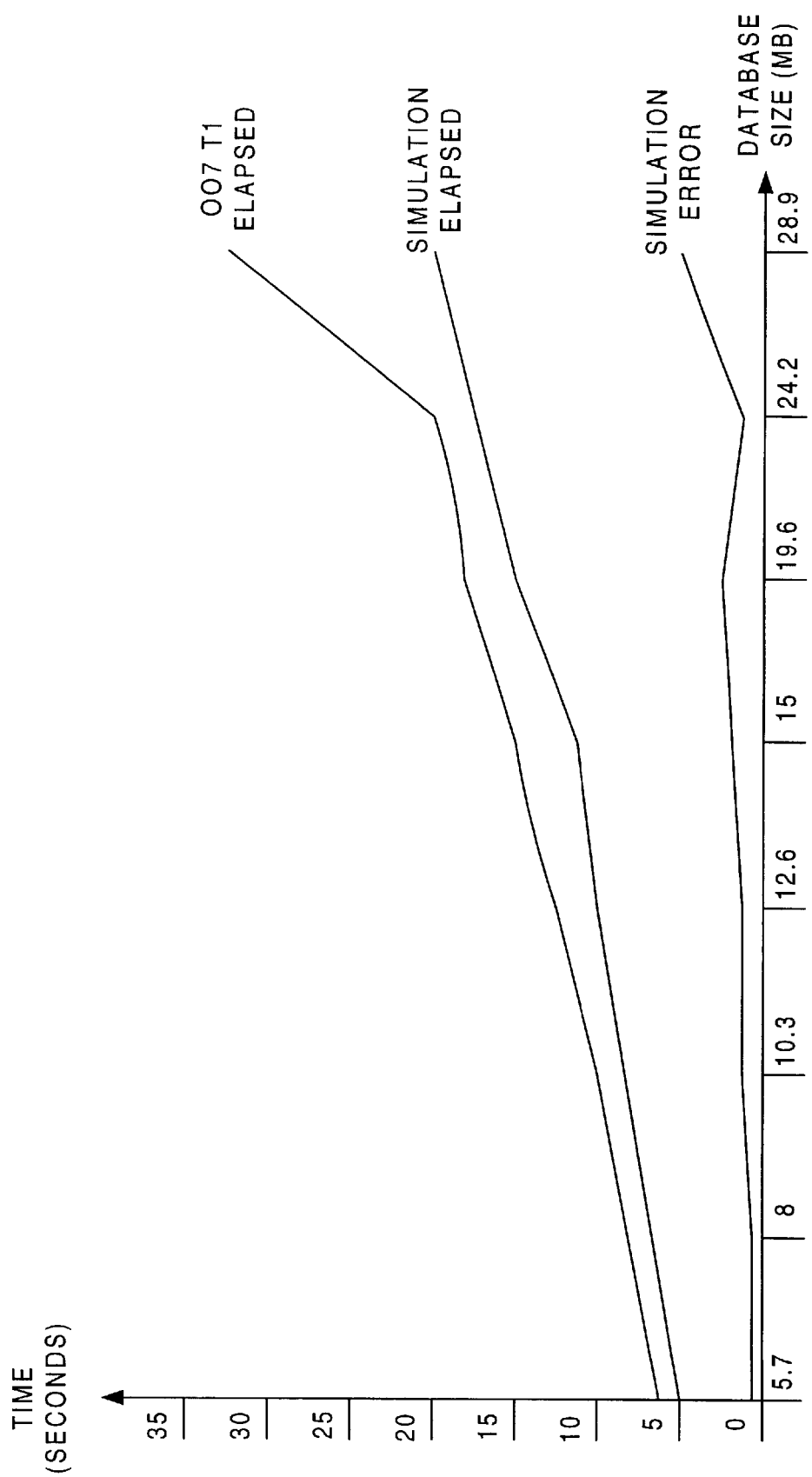
FIG. 4 is a graph showing the execution time required for an OO7 application running T1 on Opal compared with a corresponding simulation of its trace and the error of the simulation, as a function of database size.

In FIG. 4, the execution time of the original OO7 application running T1 on Opal is compared with the simulation of its trace using the application simulator on Opal. The simulation error is the difference between these two times. This graph clearly shows that the performance of the simulated trace indeed follows the performance of the original application running on the same system. It also shows that the simulation error scales well with database size. This finding validates the trace collection and replay strategy of the present invention.

Figure 5:
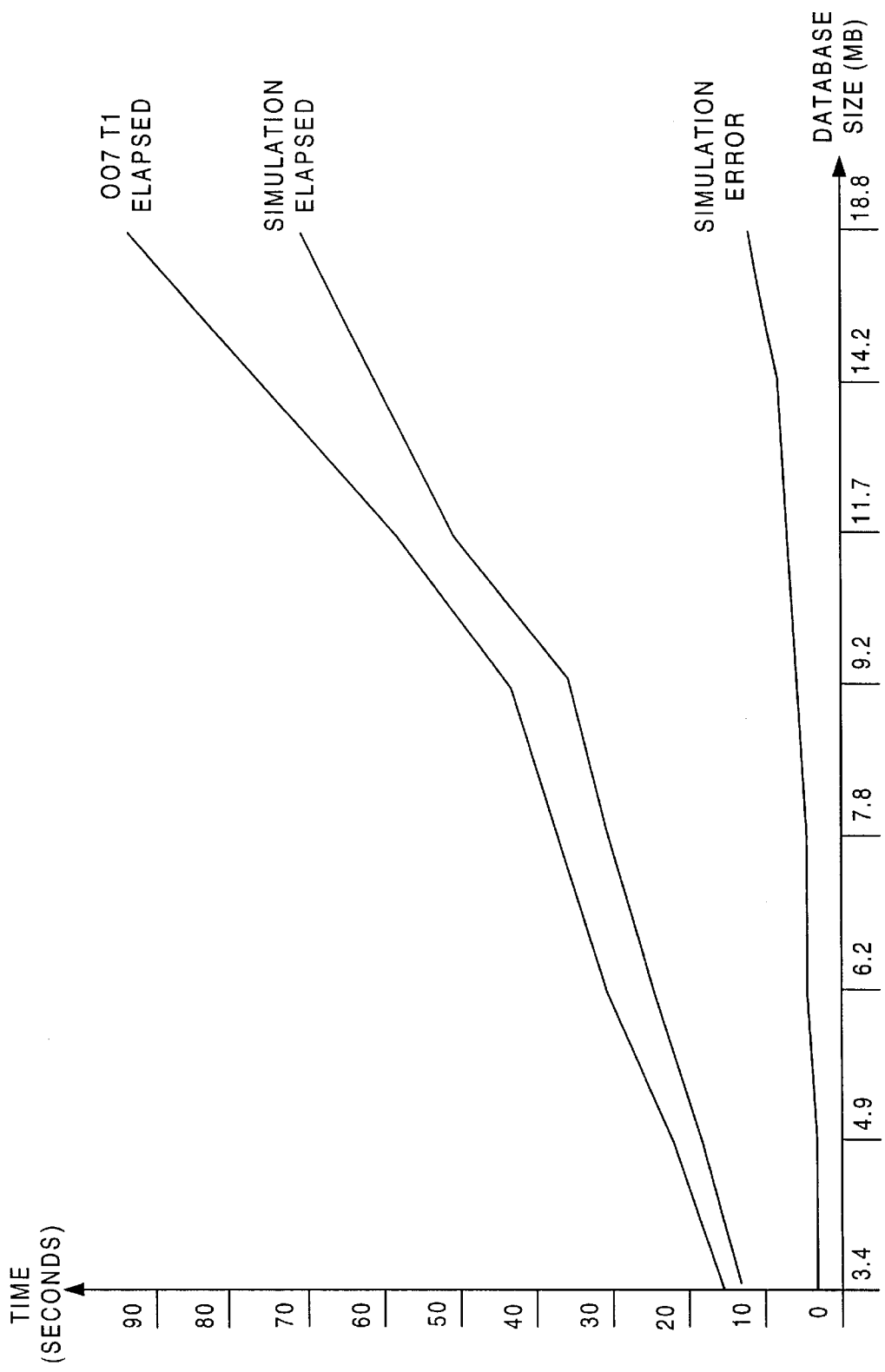
FIG. 5 is a graph of the execution time of OO7 T1 captured on Opal, compared with a native OO7 T1 simulated on ObjectStore, as a function of database size.
Figure 6:
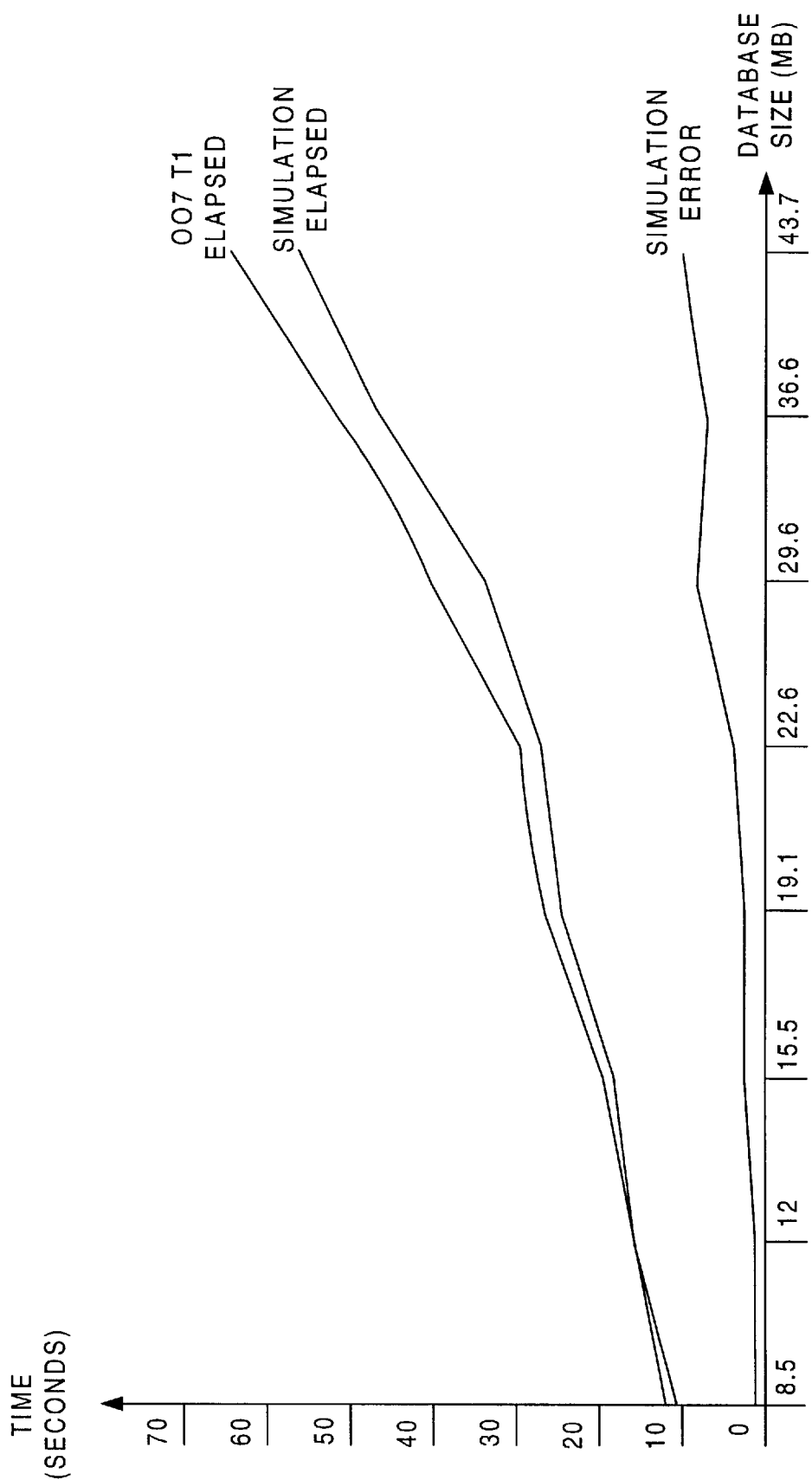
FIG. 6 is a graph of the execution time of OO7 T1 captured on Opal compared with a native OO7 T1 simulation on Texas, as a function of database size.

In FIG. 5, the execution time of OO7/T1 captured on Opal is compared with a native OO7/T1 simulated on ObjectStore. In FIG. 6, the execution time of OO7/T1 captured on Opal is compared with a native OO7/T1 simulated on Texas. Texas and ObjectStore are object oriented database management systems (OODBMSs) that produce and manage OODBs for an application. These figures address an application developer's need to compare the performance of an application on multiple OODBs produced by different OODBs. The results show that the capture of a trace on one OODB and its simulation on another still accurately captures the behavior of the original application. This result implies that the present invention has captured the behavior of the application in an OODB-independent fashion. Thus, the traces can be used to predict the performance of the application on a different OODB; this capability reduces the task of porting applications onto different OODBs to the task of porting the simulator onto those OODBs. The database sizes for OO7 and its simulation were comparable for each of Opal, ObjectStore, and Texas. It is important to note that a direct comparison of the performance of OO7 (or its trace simulation) across the three systems is not possible without calibration, since these systems run on different hardware, operating system and compiler platforms. Moreover, these numbers do not reflect any database-specific optimizations or tuning.

Finally, porting the application simulator to different OODBs is a relatively straight forward task. For example, the initial implementation of the present invention from Opal (running on a 64-bit DEC Alpha using the g++ compiler) has been ported to an implementation of Texas (also running on 64-bit DEC Alpha and using the g++ compiler) in a few hours. The port to ObjectStore (running on an SGI R4000 processor in 32-bit mode and using a C-front compatible compiler) took about a day. Both the results for ObjectStore and Texas reported above are from these ports—without optimizations. These results thus demonstrate the portability of the present invention.

Aside from OODBs, the present invention may also be used to study persistent object storage systems, object repositories, distributed object-oriented systems and object-oriented programming languages. For example, the present invention may be employed with distributed object-oriented systems by modifying the trace generation component to detect and instrument remote object accesses instead of the persistent object accesses without any significant modifications to the rest of the components.

Figure 7A:
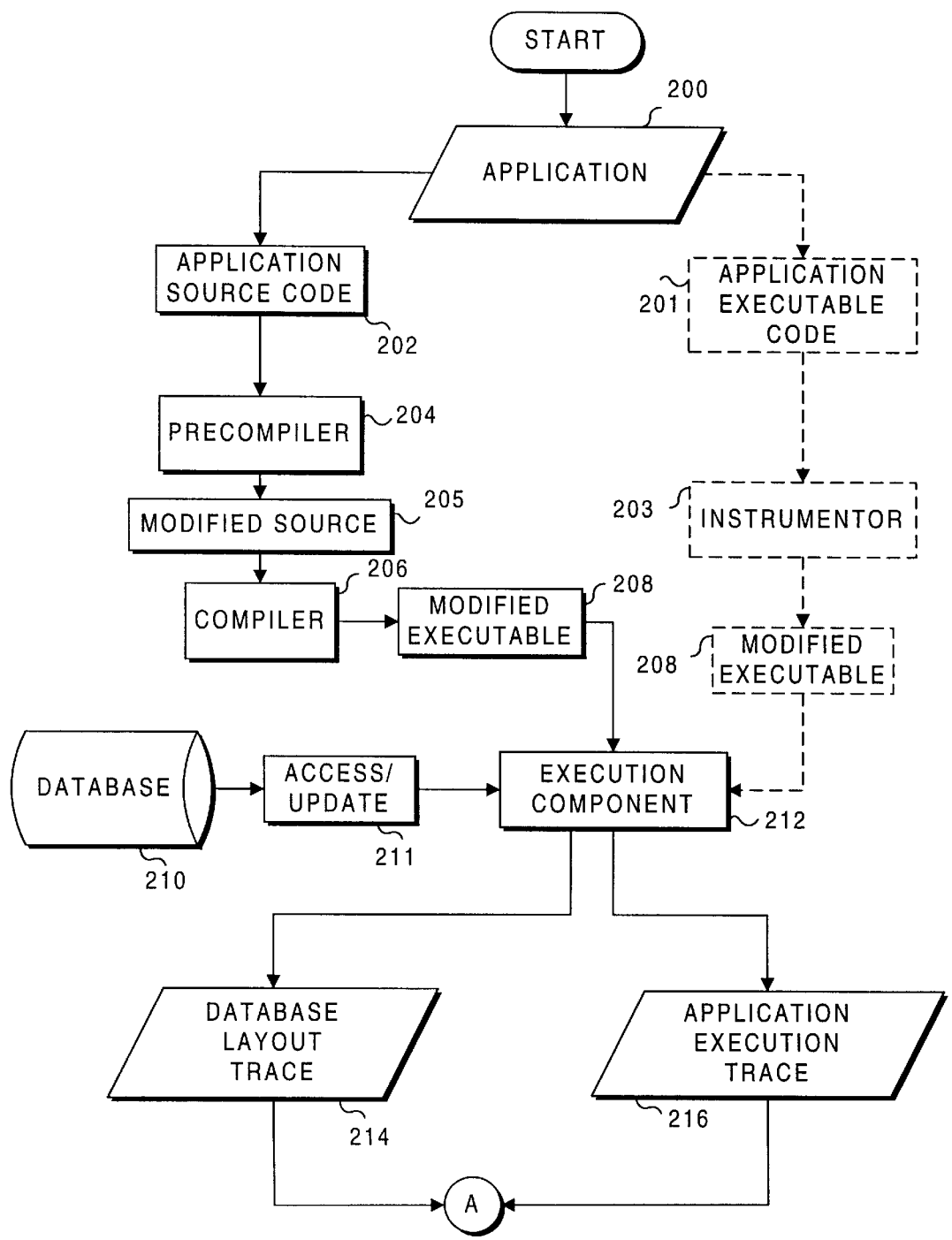
FIGS. 7a and 7b are a schematic diagram illustrating the logical flow of the functional elements and steps employed by the present invention for an OODB.

In FIG. 7a, an overview of the functional components and steps of the present invention is shown. Moving from a start block, an application 200 that is to be simulated is provided. Source code 202 for the application is input to a precompiler 204, which precompiles the source code, producing modified source code 205. The precompiled code is input to a compiler 206. Modified executable code 208 is produced by compiler 206, and an execution component 212 executes the modified executable code. During execution, execution component 212 accesses and updates a database 210, as indicated in a block 211.

An alternative embodiment is also contemplated that employs an instrumentor 203 to instrument application executable code 201 for application 200 and produces modified executable code 208 for input to execution component 212.

Figure 7B:
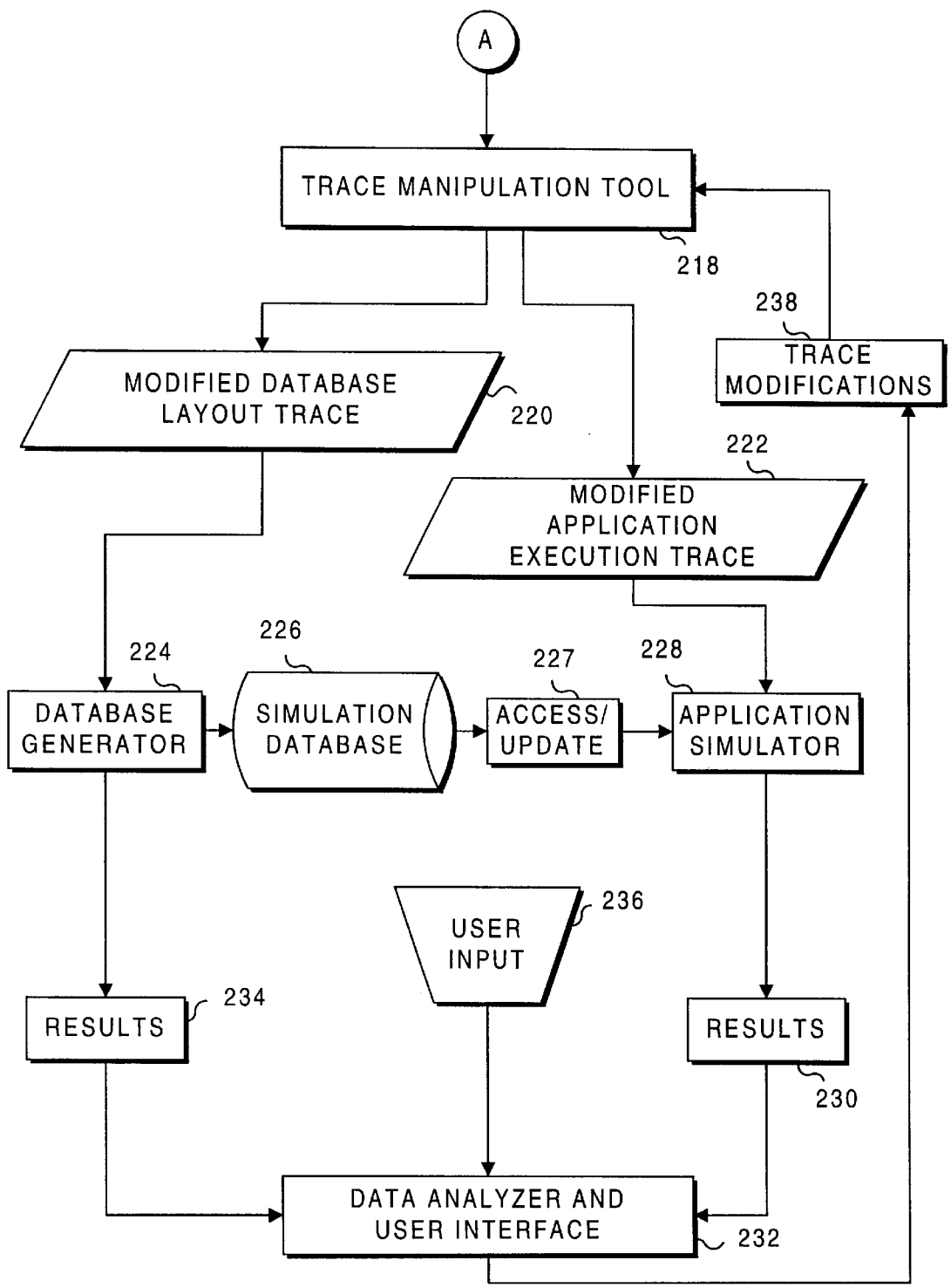

Execution component 212 produces database layout trace 214 and application execution trace 216. These two traces are provided to trace manipulation tool 218, which is illustrated in FIG. 7b. Modified database layout trace 220 and modified application execution trace 222 are produced by trace manipulation tool 218. Database generator 224 receives modified database layout trace 220 and produces simulation database 226 and results 234 for input to a data analyzer and user interface 232. An exemplary table illustrating typical information included in results 234 is shown in FIG. 13. Application simulator 228 receives modified application execution trace 222 and outputs results 230 to data analyzer and user interface 232. An exemplary table illustrating information typical of results 230 is shown in FIG. 14. Application simulator 228 access and update data from simulation database 226.

Input 236 by the user to data analyzer and user interface 232 produces initial (or additional) trace modifications 238 that are input to trace manipulation tool 218. Also, data analyzer and user interface 232 produce analysis data for review by the user. FIG. 12 includes an exemplary table illustrating typical analysis data provided to the user by data analyzer and user interface 232. By using the information provided, the user may iteratively modify the simulated execution of application 208 on simulation database 226 to achieve a desired operating efficiency or to achieve some other desired result.

Figure 8A:
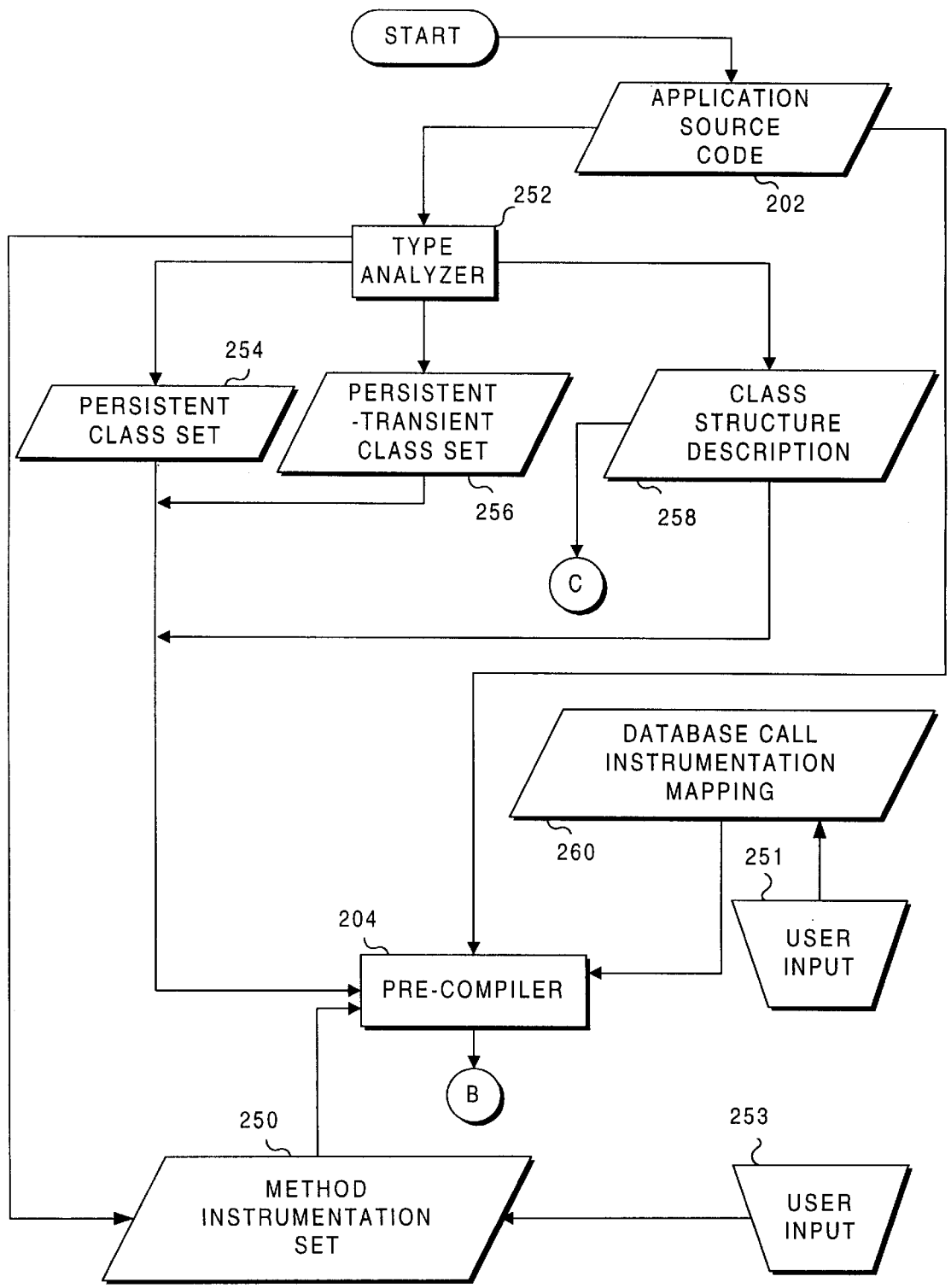

In FIG. 8a, a detailed schematic of the present invention's trace generation components and their logical/functional relationships is shown. Moving from a start block, application source code 202 is provided to type analyzer 252, which provides set of persistent classes 254, set of persistent-transient classes 256, and class structure description 258.

Persistent classes 254 and persistent-transient classes 256 are provided to precompiler 204. Also, a set 250 of methods to instrument, a mapping 260 between database calls and their instrumented version, and application source code 202 are provided to precompiler 204. A user input 251 is employed to manually provide mapping 260 to precompiler 204 during an initial configuration for each OODB. Set 250 is produced by type analyzer 252, and a user input 253 is employed to provide the set to precompiler 204 during the initial configuration of each OODB.

Figure 8B:
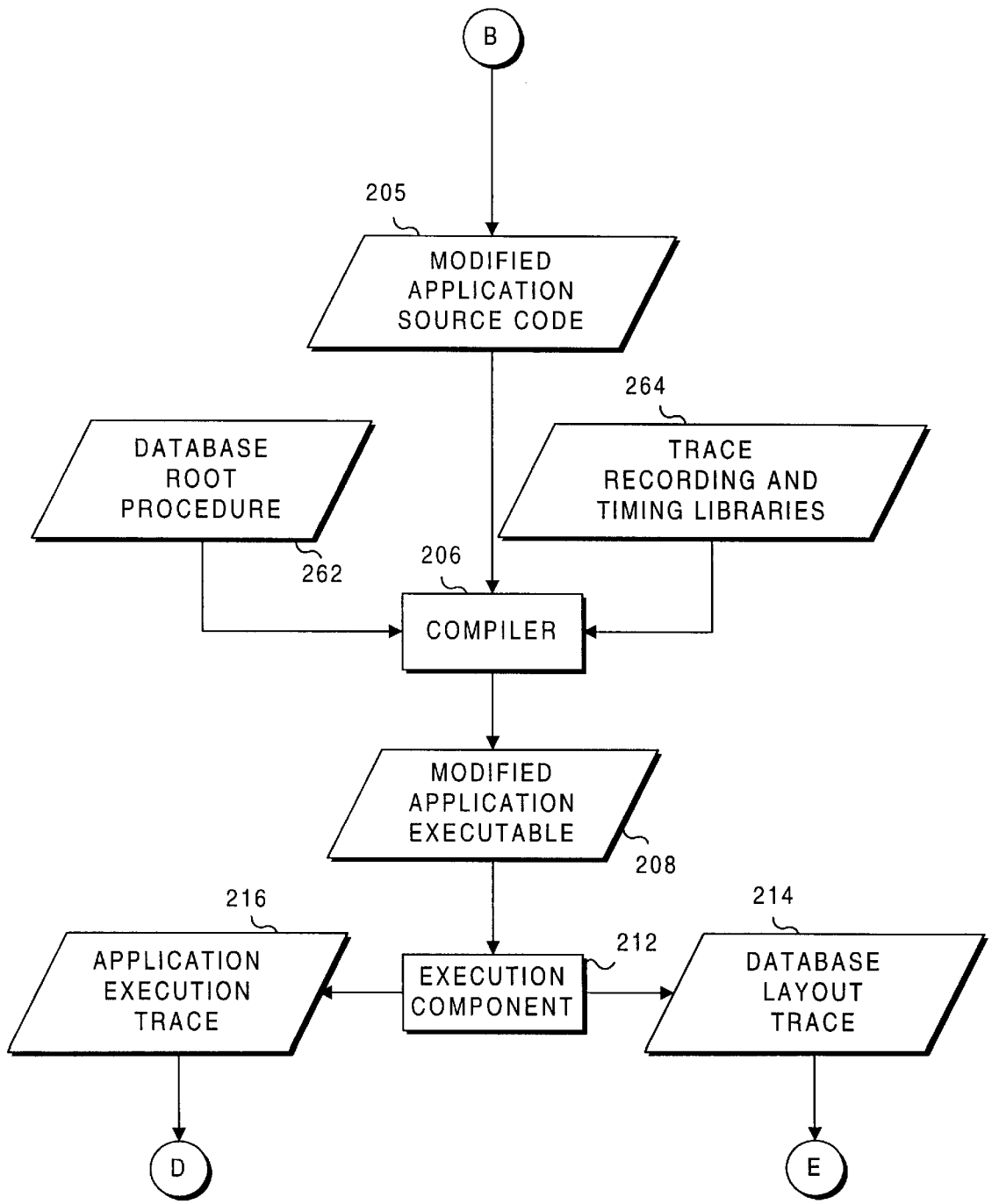
Figure 8C:
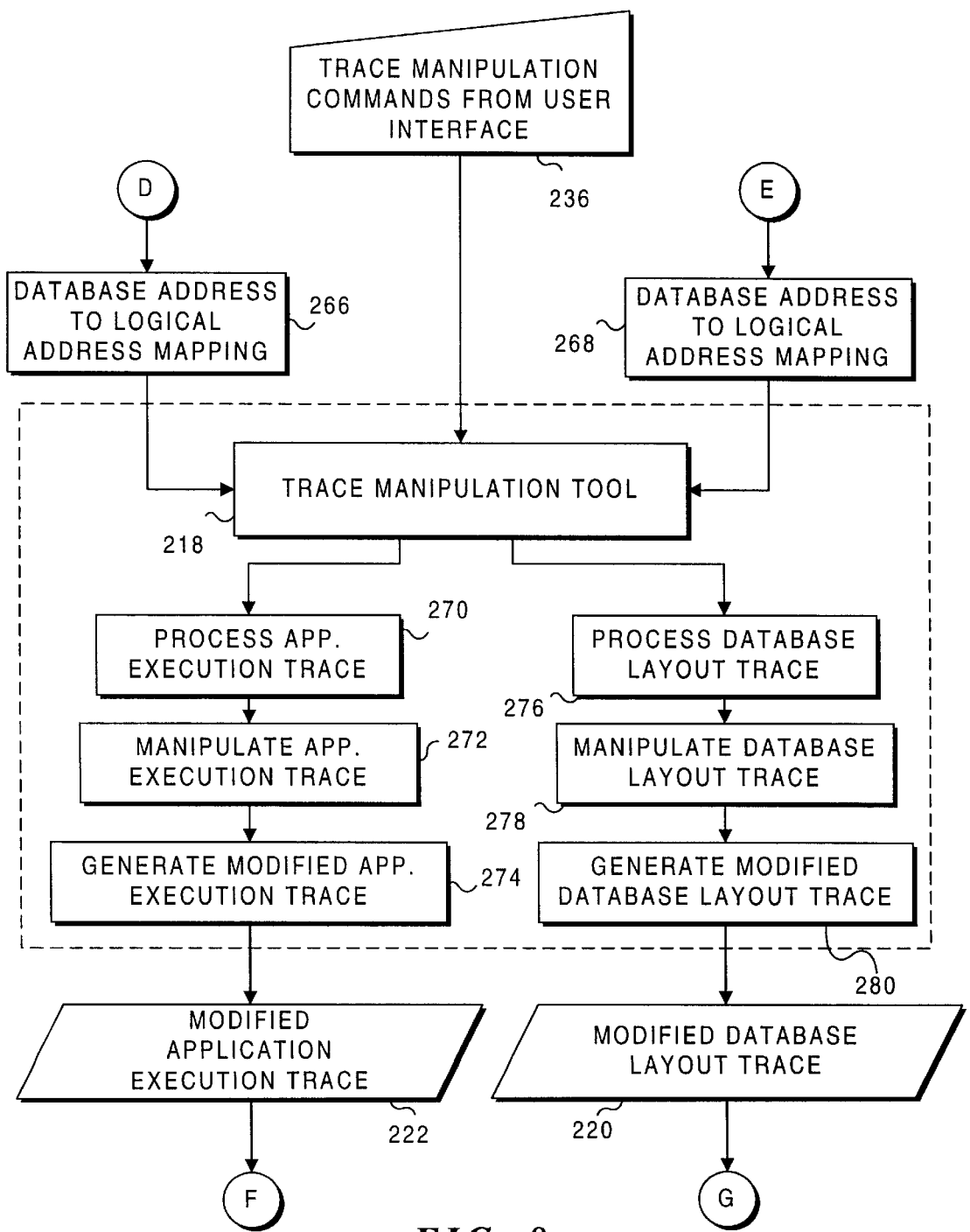

In FIG. 8b, precompiler 204 provides modified application source code 205 to compiler 206. Also, a database root procedure 262 and trace recording and timing libraries 264 are input to compiler 206. Modified application executable code 208 is produced by compiler 206 and input to execution component 212. Application execution trace 216 and database layout trace 214 are output from execution component 212. FIG. 8c illustrates the application of a database address to logical address mapping 266, and a database address to logical address mapping 268 for application execution trace 216 and database layout trace 214, respectively. The logical to address to database address mappings for both traces are input to trace manipulation tool 218. Within trace manipulation tool 218, a component 270 processes application execution trace 216. Another component 272 manipulates the application execution trace as required to produce the desired modifications, and yet another component 274 generates modified application execution trace 222. Similarly, a component 276 processes database layout trace 214, and a component 278 manipulates the database layout trace as required to achieve the desired modifications. Further, a component 280 generates modified database layout trace 220. Input 236 is provided from the user as trace manipulation commands to control the manipulation of the two input traces by trace manipulation tool 218.

Figure 8D:
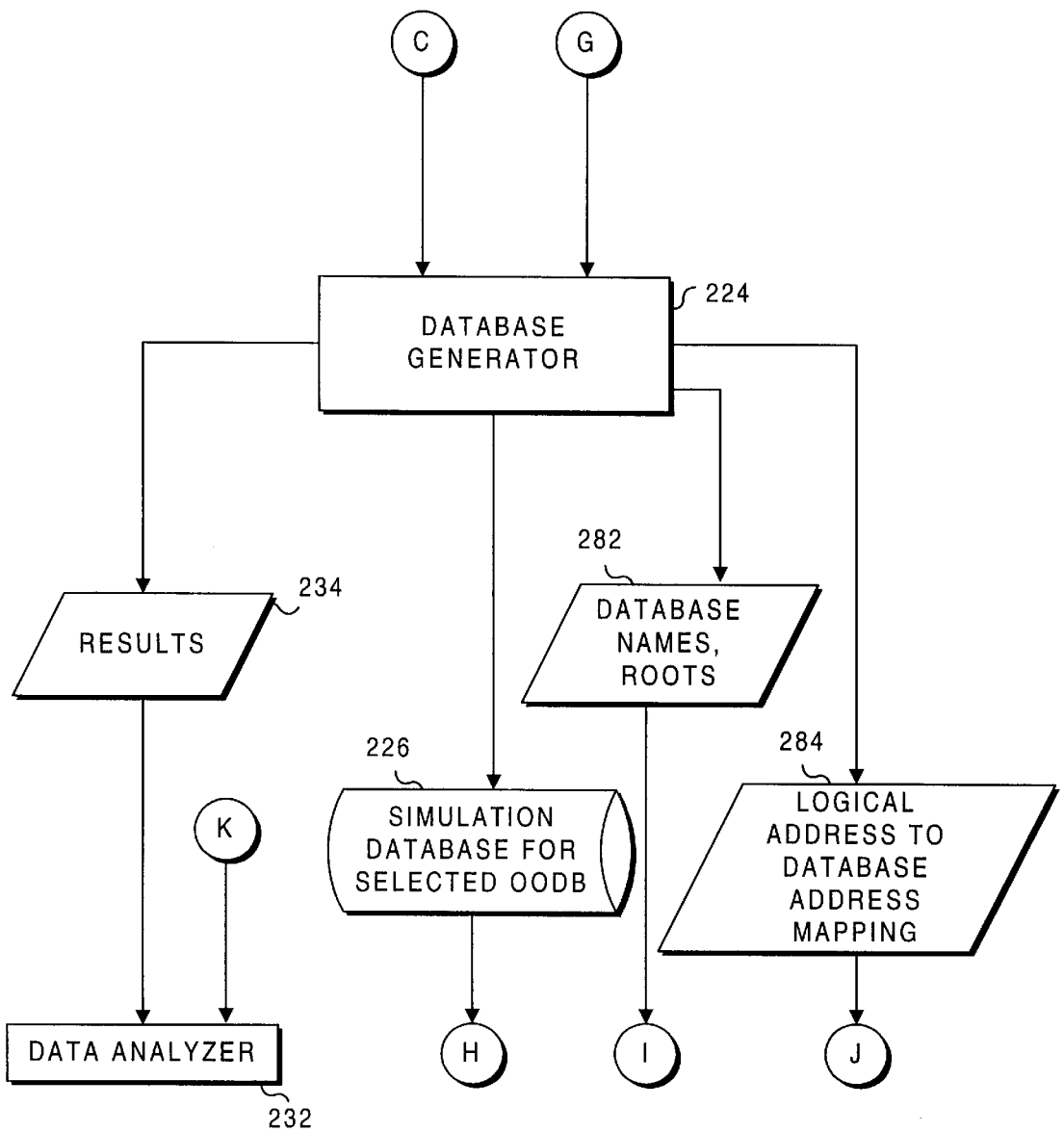
Figure 8E:
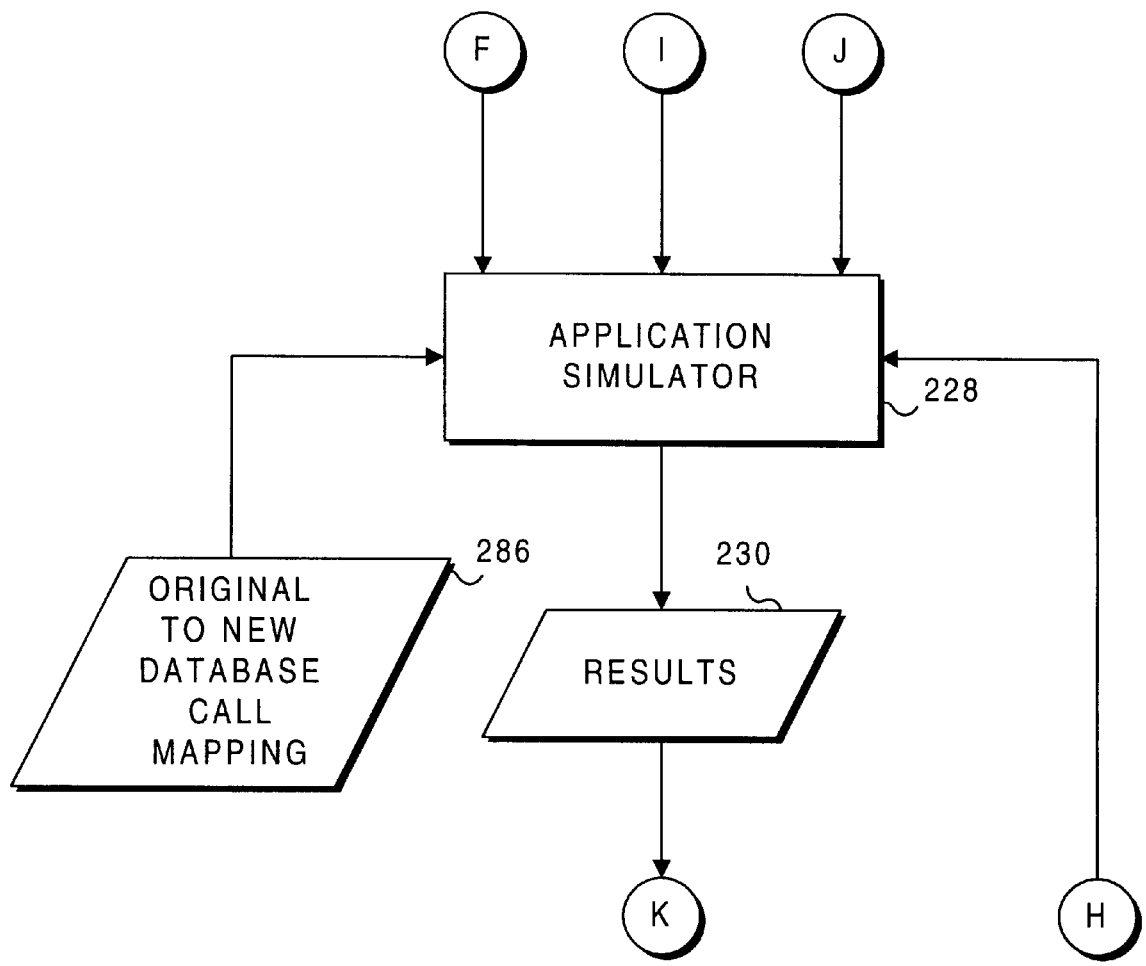

In FIG. 8d, data base generator 224 receives modified database layout trace 220 and class structure description 258. Database generator 224 produces results 234, simulation database 226, database names and roots 282, and a logical address to database address mapping 284. Also, results 230 and results 234 are provided to data analyzer 232. In FIG. 8e, application simulator 228 receives modified execution trace 222, logical address to database address mapping 284, database names and roots data 282, simulation database 226, and an original to new database call mapping 286. Application simulator 228 produces results 230 for input to data analyzer 232.

Distributed Object Oriented Application

Figure 17A:
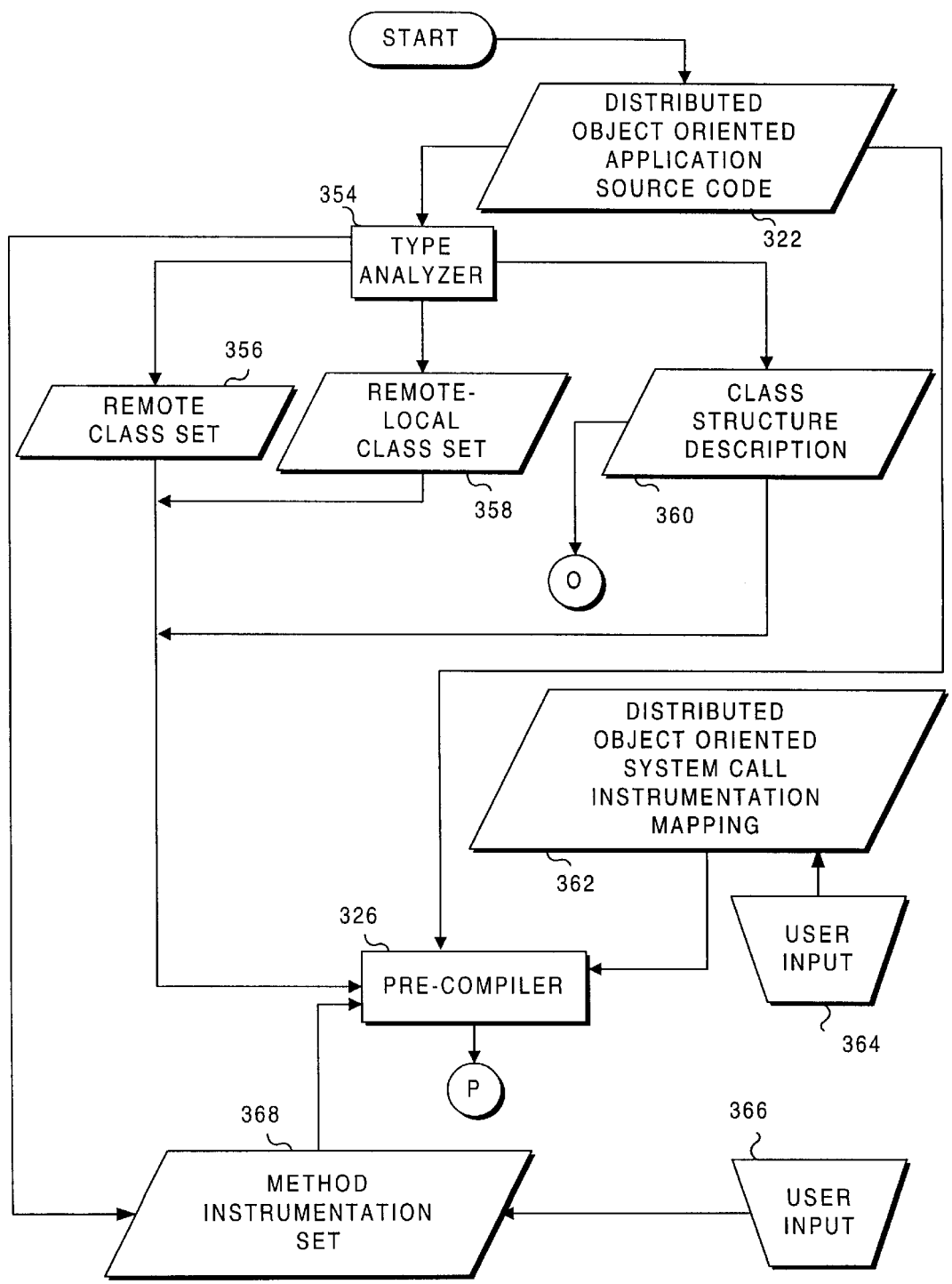

In another preferred embodiment, the present invention simulates the execution of an application on a distributed object oriented system (DOOS). A Distributed Object-Oriented Application (DOOA) is written in an object-oriented programming language like C++ or Java in such a way that parts of applications, comprised of groups of objects, executing on multiple computers, can communicate with each other. This communication is facilitated and coordinated by an infrastructure component called a Distributed Object Oriented System (DOOS). An example of DOOS includes the object-request brokers (ORBs) that comply with the Object Management Group's (OMG) Common Object Request Broker (CORBA) standard. Another example is the Java Remote Method Invocation (RMI) facility. Instrumenting the invocation of remote methods is employed by the present invention to perform analysis, benchmarking and tuning of Distributed Object-Oriented Systems (DOOS) and their applications. An execution component 334 (FIG. 16a) coordinates the execution of multiple applications on multiple computers. In FIG. 17a, the DOOS embodiment instruments the set of remote object invocations using a Distributed Object-Oriented System call instrumentation mapping 362, which is provided to precompiler 326. A set of remote classes 356 and remote and local classes 358 are generated by a type analyzer 354. Pre-compiler 326 augments a distributed object-oriented application source code 322 to instrument remote methods and calls to the DOOS. While compiling a modified application source code 328, a Distributed Timing and Coordination library 372 is linked to the compiled code. This linked library is employed to coordinate the beginning and ending of trace recording on multiple nodes and synchronizes the time-stamps across the different nodes.

Execution component 334 generates multiple application execution traces 338 and 338' and a remote object address to logical object address mapping 336. This mapping is used to convert all remote object references in the application execution trace into logical addresses. The multiple application execution traces are combined into a graph representation in a trace representation and manipulation tool 340.

An application simulator 346 executes on multiple computers connected by a network. On startup, application simulator 346 accepts a modified application execution trace 344 from trace manipulation tool 340. By examining trace 344, application simulator 346 determines on which computers the simulator should be started. It then creates and initializes simulators on these computers. During the initialization phase, the simulator will create all of the objects on these selected computers that are referenced from other computers, generating a logical object address to remote object address mapping that is exchanged between all application simulators running on multiple computers. As application simulator 346 executes application execution trace 344, it uses mapping 336 to establish connections to remote objects to exchange messages.

In FIG. 16a, an overview of the functional components and steps of the other preferred embodiment of the present invention is shown. Moving from a start block, a distributed object oriented application 322 that is to be simulated is provided. Source code 324 for the application is input to precompiler 326, which precompiles the source code, producing precompiled source code 328. The precompiled code is input to a compiler 330. Modified executable code 332 is produced by compiler 330, and an execution component 334 executes the modified executable code with multiple computers on a distributed network. During execution, execution component 334 produces remote object addresses to logical address mapping 336.

Another embodiment is also contemplated that provides an instrumentor 327 for instrumenting application executable code 325 for application 322 and producing modified executable code 322 for input to execution component 334.

Execution component 334 produces application execution traces from multiple computers connected by a network. Exemplary application execution trace 338 and application execution trace 338' are provided to trace manipulation tool 340, which is illustrated in FIG. 16b. Modified application execution trace 344 is produced by trace manipulation tool 340. Application simulator 346 receives modified application execution trace 344 and supplies results 348 to data analyzer and user interface 350.

Input 352 by the user to data analyzer and user interface 350 produces initial (or additional) trace modifications 342 that are input to trace manipulation tool 340. Also, data analyzer and user interface 350 produces analysis data for review by the user. By using the information provided, the user may iteratively modify the simulated execution of application 322 to achieve a desired operating efficiency or to achieve some other desired result.

In FIG. 17a, a detailed schematic of the present invention's trace generation components and their logical/functional relationships is shown. Moving from a start block, application source code 322 is provided to type analyzer 354, which produces remote class set 356, remote and local class set 358, and a class structure description 360. Remote class set 356, remote and local class set 358, and class structure description 360 are provided to precompiler 326. Also, a mapping 362 of distributed object oriented system calls and their instrumented version, and application source code 322 are provided to precompiler 326. A user input 364 is employed to manually provide mapping 362 to precompiler 326 during an initial configuration for each DOOS. A set 368 of methods to be instrumented is produced by type analyzer 354, and a user input 366 is employed to provide the set to precompiler 326.

Figure 17B:
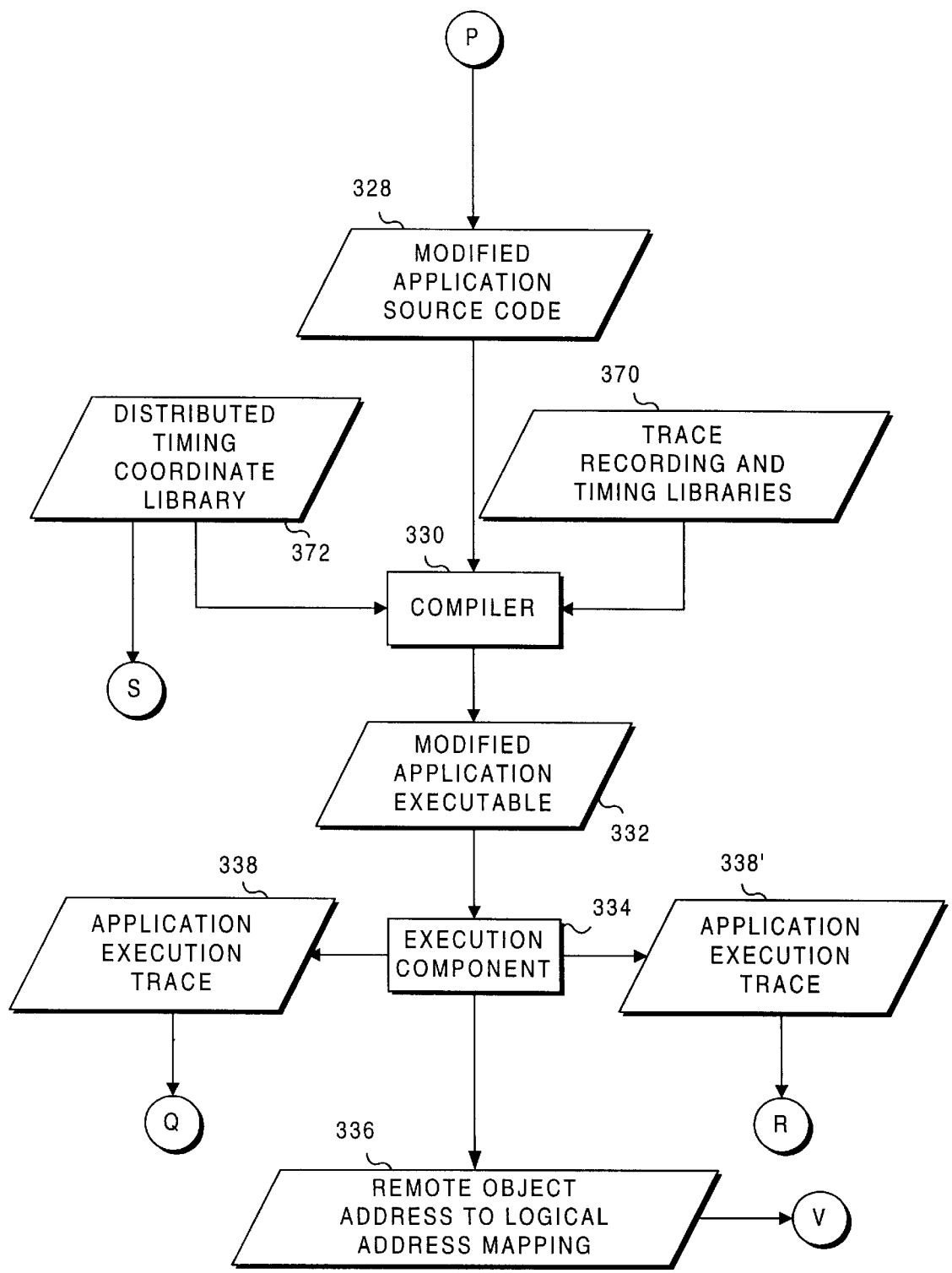

In FIG. 17b, precompiler 326 provides modified application source code 328 to compiler 330. Also, distributed timing coordinate library 372 and trace recording and timing libraries 370 are input to compiler 330. Modified application executable code 332 is produced by compiler 330 and input to execution component 334. Application execution traces 338 and 338' and remote object address to logical address mapping 336 are output from execution component 334.

Figure 17C:
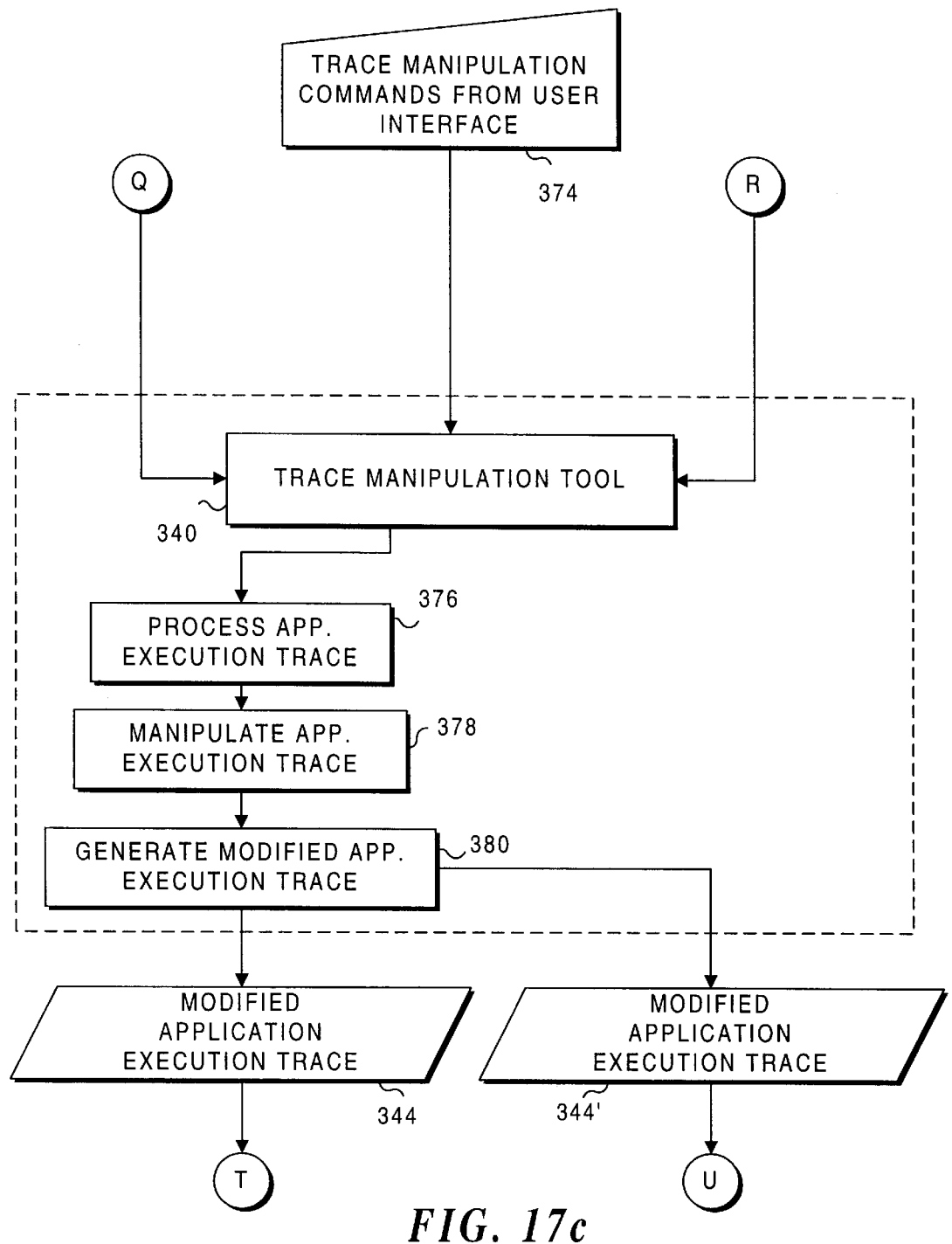

FIG. 17c shows that application execution traces 338 and 338' are input to trace manipulation tool 340. Within trace manipulation tool 340, a component 376 processes application execution traces 338 and 338'. Another component 378 manipulates the application execution traces as required to produce the desired modifications, and yet another component 380 generates modified application execution traces 344 and 344'. Additionally, input 374 is provided from the user as trace manipulation commands to control the manipulation of the two input traces by trace manipulation tool 340.

Figure 17D:
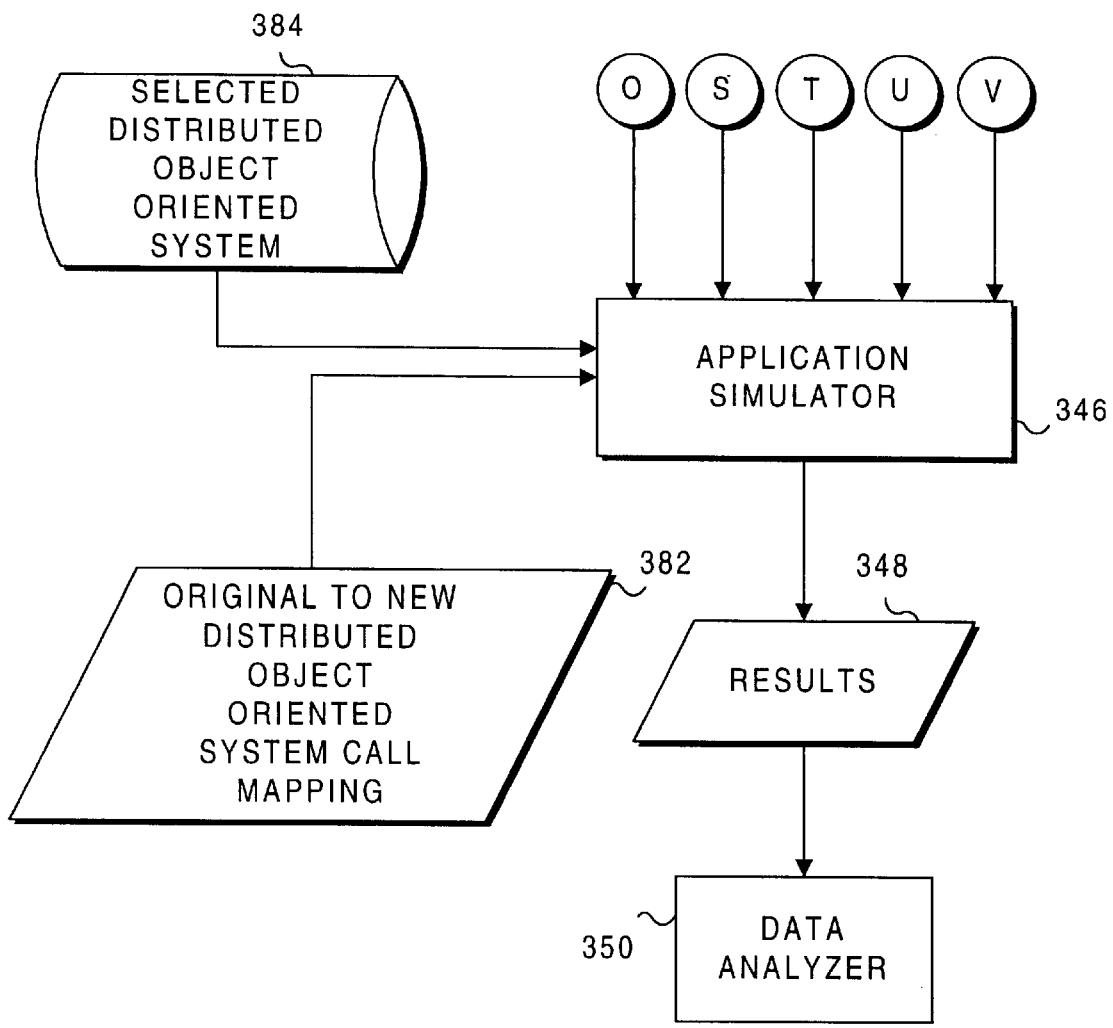

In FIG. 17d, application simulator 346 receives modified execution traces 344 and 344', class structure description 360, distributed timing coordinate library 372, and remote object address to logical address mapping 336, a selected distributed object oriented system 384, and an original to new distributed object oriented system call mapping 382. Application simulator 346 produces results 348 for input to data analyzer 350.

Computer System for Implementing the Present Invention

A computer system 300 that is appropriate for practicing the present invention is schematically illustrated in FIG. 15. The DEC or SGI computers used in the experiments discussed above are specific examples of such systems, but the invention is not limited to those machines. Instead almost any workstation, or personal computer is usable to run the software that carries out the functions of this invention discussed above. System 300 includes a CPU 302 that executes machine instructions defining these functions. The machine instructions are likely to be initially distributed on one or more floppy disk 314 or a compact disk-read only memory (CD-ROM) disk (not separately shown) and loaded into a non-volatile storage 304 (e.g., a hard drive). However, the machine instructions may optionally be stored on a server computer 320 that is coupled in data communication with the workstation or personal computer via a communication device 318 at the server computer, and a communication device 316 (i.e., a modem, or network interface card) at the workstation or personal computer. The two communication devices are coupled together by an appropriate network or communication system, the details of which are not shown. The machine instructions are loaded from the non-volatile storage into a memory 306 that is connected to the CPU, so that they can be executed by the CPU. Also stored on the non-volatile storage is the application that is to be traced. A keyboard/mouse 308 enable the user to control the operation of the present invention and to enter input data used in implementing the invention. The user is prompted for input by dialog boxes or text appearing on a display 310, which is also coupled to the CPU through a display driver (not shown). Results of running the present invention on the DOOS and application are shown on display 310 and may be printed on a printer, which is also not shown.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for simulating the execution of an application with an object oriented database management system (OODB), using a computer, comprising the steps of:
   (a) augmenting code comprising the application, producing augmented code, the augmented code including new instructions that enable the application to produce an application execution trace and a database layout trace;
   (b) executing the augmented code with a database on the OODB, the execution of the augmented code producing the application execution trace and the database layout trace; and
   (c) employing a simulator to simulate the execution of the application with the database on the OODB, the simulator employing the database layout trace and the application execution trace to produce a simulation that yields results for analysis, the results being employed to analyze the execution of the application with the database.

2. The method of claim 1, wherein the step of augmenting further comprises the steps of:
   (a) augmenting source code comprising the application prior to augmentation, to produce augmented source code; and
   (b) compiling the augmented source code, producing augmented object code that is linked to a library for recording traces, the augmented object code being executable by a computer.

3. The method of claim 2, wherein the step of augmenting the source code further comprises at least one of precompiling, manually augmenting, and automatically augmenting the source code to produce the augmented source code.

4. The method of claim 2, further comprising the steps of:
   (a) analyzing the source code to determine parameters associated with augmenting the source code; and
   (b) providing the parameters for precompilation, and thereby employing the parameters in the production of the augmented source code.

5. The method of claim 4, wherein the parameters comprise at least one of a persistent class set, a persistent-transient set, and a class structure description.

6. The method of claim 2, wherein the step of augmenting employs different parameters in the production of augmented source code, the parameters comprising a set of methods to instrument and a map of database calls to instrument.

7. The method of claim 2, wherein the compiler employs different parameters in the production of the augmented object code, said different parameters including at least one of a procedure describing database roots, a trace recording library, and a trace timing library.

8. The method of claim 1, wherein the step of augmenting the code further comprises the step of instrumenting object code comprising the application, producing the augmented code that is executed by the computer.

9. The method of claim 1, wherein an object address in the application execution trace and the database layout trace are converted from a database address to a logical address.

10. The method of claim 1, further comprising the step of combining the address execution trace and the database layout trace into a graph data structure.

11. The method of claim 10, further comprising the step of modifying the contents of the graph data structure in accordance with an input by a user.

12. The method of claim 11, further comprising the steps of:
    (a) generating a modified database layout trace and a modified application execution trace with the contents of the graph data structure; and
    (b) enabling a user to modify at least one parameter associated with the simulation.

13. The method of claim 12, wherein the modifications to the database layout trace and the application execution trace modify the results produced by the simulation, producing modified results, the modified results enabling the execution of the application with the modifications to be evaluated.

14. The method of claim 13, further comprising the step of enabling the simulation to be rerun after further modifications have been made, producing results from the simulation for different conditions, for comparison.

15. The method of claim 14, wherein the further modifications are based on results previously produced by the simulation.

16. The method of claim 12, further comprising the steps of:
    (a) manipulating the application execution trace in accord with an input provided by the user; and
    (b) generating a modified application execution trace that includes a modification defined by the input; and
    (c) employing the modified application execution trace to produce the simulation.

17. The method of claim 16, further comprising the step of simulating the application execution trace to produce results.

18. The method of claim 17, further comprising the step of mapping calls to the OODB to another OODB selected by the user.

19. The method of claim 17, wherein the step of displaying occurs in real time.

20. The method of claim 12, further comprising the steps of:
    (a) manipulating the database layout trace in accord with an input provided by the user; and
    (b) generating a modified database layout trace that includes a modification defined by the input; and
    (c) employing the modified database layout trace to produce the simulation.

21. The method of claim 20, wherein the input provided by the user indicates that a different database clustering is to be used for the simulation.

22. The method of claim 1, further comprising the steps of enabling the user to select another OODB for simulation, and running the simulation on the other OODB.

23. The method of claim 22, further comprising the step of producing other results by running the simulation on the other OODB, for comparison to the results from running the simulation on the OODB.

24. The method of claim 22, wherein the step of running the simulation on the other OODB further comprises the steps of:
(a) generating a layout for each object in a simulation database created on the other OODB from the database layout trace, the database layout trace being used to determine a structure and a disposition for each object in the other OODB; and
(b) simulating the application execution trace with the simulation database on the other OODB.

25. The method of claim 1, wherein the OODB is produced by an object oriented database management system (OODBMS), the OODBMS comprising one of Texas and ObjectStore.

26. The method of claim 1, further comprising the step of generating a simulation database from the database layout trace.

27. The method of claim 26, wherein the simulation database produces parameters that include database names, database roots, a logical address to database address mapping, and results associated with the generation of the simulation database.

28. The method of claim 26, further comprising the step of changing the simulation database, changes to the simulation database comprising at least one of adding, deleting, and modifying objects in the simulation database.

29. The method of claim 26, further comprising the step of comparing the results associated with at least one of the application execution trace and with the database layout trace to a previous result.

30. The method of claim 26, further comprising the step of displaying the analysis to the user.

31. The method of claim 1, further comprising the step of producing an analysis of the simulation, enabling the user to analyze results associated with the application execution trace and results associated with the database layout trace.

32. The method of claim 1, wherein the application execution trace has a data structure that comprises one or more of an object address, a type, a method, an entry time stamp, and an exit time stamp.

33. The method of claim 1, wherein the database layout trace has a data structure that includes one or more of an object address, a type, a size, an offset, an entry time stamp, and an exit time stamp.

34. A storage medium having processor-executable instructions for performing the steps recited in claim 1.

35. A method for simulating the execution of an application with an object oriented database management system (OODB), comprising the steps of:
(a) augmenting code comprising the application, producing augmented code, the augmented code including new instructions that enable the application to produce an application execution trace and a database layout trace;
(b) executing the augmented code with a database on the OODB, the execution of the augmented code producing the application execution trace and the database layout trace;
(c) employing a simulator to simulate the execution of the application with the database on the OODB, the simulator employing the database layout trace and the application execution trace to produce a simulation that yields results for analysis, the results being employed to analyze the execution of the application with the database; and
(d) enabling another simulation of the execution of the application on another OODB selected from a plurality of different OODB, so that results are analyzed for comparison between the simulation on the OODB and the other simulation on the other OODB.

36. A system for simulating the execution of an application with an object oriented database management system (OODB), comprising:
(a) a processor; and
(b) a memory being coupled to the processor, the memory storing a plurality machine instructions that cause the processor to perform a plurality of logical steps when implemented by the processor, said logical steps including:
(i) augmenting code comprising the application, producing augmented code, the augmented code including new instructions that enable the application to produce an application execution trace and a database layout trace when executed by the processor;
(ii) executing the augmented code on the processor, with a database on the OODB, the execution of the augmented code producing the application execution trace and the database layout trace; and
(iii) causing the processor to act as a simulator to simulate the execution of the application with the database on the OODB, the simulator employing the database layout trace and the application execution trace to produce a simulation that yields results for analysis, the results being employed to analyze the execution of the application with the database.

* * * * *

UNITED STATES PATENT AND TRADEMARK OFFICE
CERTIFICATE OF CORRECTION

PATENT NO. : 6,145,121
DATED : November 7, 2000
INVENTOR(S) : Levy et al.

It is certified that error appears in the above-identified patent and that said Letters Patent is hereby corrected as shown below:

<u>Title page,</u>
Item [56], OTHER PUBLICATIONS,
-- Alfons Kember, Donald Kossman, *Adaptable Pointer Swizzling Strategies* (ABSTRACT) (visted 3/31/98), VLDB Journal, 4(3):519-567 (1995) © 1995 by the VLDB Endowment, <http://sunsite.informatik.rwth-aachen.de/dblp/db/journals/vldb/KemperK95.HTML>, 1pg.
*Object-Orientation FAQ*, 41 THE TEXAS PERSISTENT STORE, Version 0.1 (visited 3/1/98) <http://www.cyberdyne-object-sys.com/oofaq/oo-faq-S-11.10.0.41.html>, 2pp.
OOPS GROUP PUBLICATIONS (visted 3/31/98) *Sections* 1-13, <http://www.cs.utexas.edu/users/oops/papers.html>, 7pp.
*Using persistent objects*, POET SOFTWARE, THE ESSENTIAL OBJECT DATABASE FOR WINDOWS NT®, (visted 3/26/98), <http://www.poet.com/vbasic/uprsob.htm>, 19pp.
*Pointer swizzling: virtual address space for free* (was Re: Is 64 bit *vs.* 128) (visited 3/31/98), <http://cui.unige.ch/OSG/people/jvitek/Resources/Architecture/Year95/msg00179.html>, 2pp.
SECTION 1: BASICS (visted 3/26/98), <http://www.cyberdyne-object-sys.com/oofaq2/body/basics.htm>, 21pp. --.

Item [56], OTHER PUBLICATIONS 2$^{nd}$ Ref. "databse" should be -- database --.

<u>Column 3,</u>
Line 47, "automafically" should read -- automatically --.

Signed and Sealed this

Sixteenth Day of April, 2002

*Attest:*

JAMES E. ROGAN
*Attesting Officer*   *Director of the United States Patent and Trademark Office*